(12) United States Patent
Tagata et al.

(10) Patent No.: US 7,293,413 B2
(45) Date of Patent: Nov. 13, 2007

(54) VEHICLE BRAKING DEVICE

(75) Inventors: Kazuhiro Tagata, Nagano (JP); Koji Sakai, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 77 days.

(21) Appl. No.: 11/392,936

(22) Filed: Mar. 30, 2006

(65) Prior Publication Data

US 2006/0230758 A1 Oct. 19, 2006

(30) Foreign Application Priority Data

Mar. 31, 2005 (JP) ............................. 2005-105052
Mar. 31, 2005 (JP) ............................. 2005-105057

(51) Int. Cl.
*B60T 13/20* (2006.01)
(52) U.S. Cl. ....................... 60/552; 60/547.1
(58) Field of Classification Search .............. 60/547.1, 60/552, 553, 554
See application file for complete search history.

(56) References Cited

U.S. PATENT DOCUMENTS 6,513,327 B2 * 2/2003 Nishii et al. ............... 60/547.1
7,083,240 B2 * 8/2006 Matsuno et al. ............ 60/554
7,093,435 B2 * 8/2006 Matsuno et al. ............ 60/552
7,104,058 B2 * 9/2006 Matsuno et al. ............ 60/552

FOREIGN PATENT DOCUMENTS

JP 4-283157 A 10/1992

\* cited by examiner

*Primary Examiner*—Michael Leslie
(74) *Attorney, Agent, or Firm*—Arent Fox LLP

(57) ABSTRACT

There is provided a vehicle braking device in which a front outer periphery of a backup piston that can directly press a master piston from behind when output fluid pressure from a fluid pressure generation source is reduced is fluid-tightly and slidably fitted to a short cylindrical separator, a sleeve forming an annular channel between itself and an outer periphery of the backup piston is placed backward of the separator, and annular seal members for sealing front and rear sides of the annular passage are mounted between the separator and the backup piston, and between the sleeve and the backup piston. The seal member for sealing a front side of the annular passage is mounted to an inner periphery of the separator so as to come into repulsive contact with the outer periphery of the backup piston. The seal member for sealing a rear side of the annular passage is mounted to the outer periphery of the backup piston so as to come into repulsive contact with an inner periphery of the sleeve. Thus, it is possible to reduce an axial size of the vehicle braking device.

3 Claims, 11 Drawing Sheets

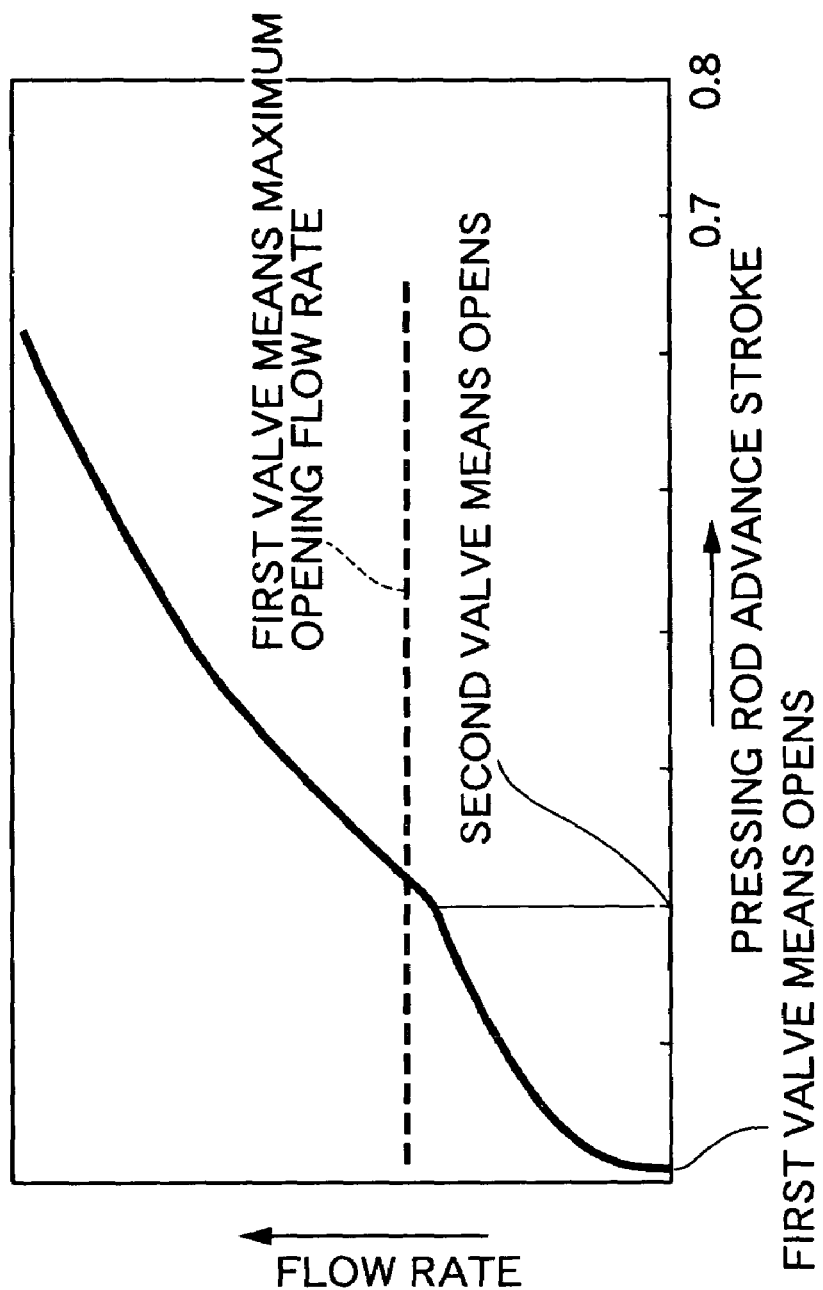

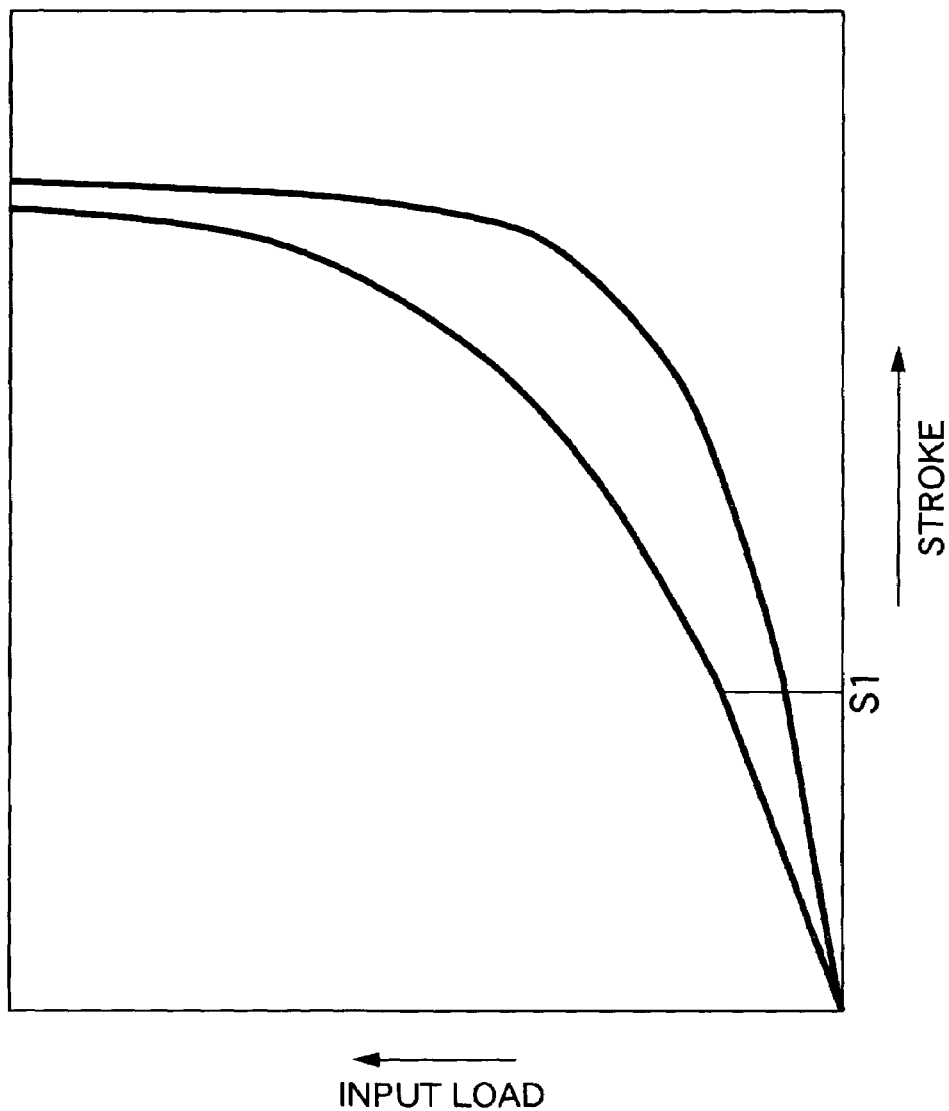

VEHICLE BRAKING DEVICE

RELATED APPLICATION DATA

The present invention is based upon Japanese priority application Nos. 2005-105052 and 2005-105057, which are hereby incorporated in their entirety herein by reference.

BACKGROUND OF THE INVENTION

1. Field of the Invention

The present invention relates to a vehicle braking device comprising: a master cylinder in which a master piston having a rear surface facing a booster fluid pressure working chamber is slidably housed in a casing; pressure regulating valve means for regulating output fluid pressure from a fluid pressure generation source to fluid pressure corresponding to a brake operation input from a brake operation member to cause the fluid pressure to act on the booster fluid pressure working chamber; a backup piston that has a closed front end facing the booster fluid pressure working chamber and is slidably housed in the casing so as to directly press the master piston from behind corresponding to an operation of the brake operation member when the output fluid pressure from the fluid pressure generation source is reduced; a short cylindrical separator fluid-tightly fitted and secured to the casing so that a front outer periphery of the backup piston is slidably fitted to the short cylindrical separator; and a cylindrical sleeve that forms a channel between the cylindrical sleeve and the separator, forms an annular passage communicating with the channel between the cylindrical sleeve and an outer periphery of the backup position, and is fluid-tightly fitted and secured to the casing backward of the separator, annular seal members for sealing front and rear sides of the annular passage being mounted between the separator and the backup piston, and between the sleeve and the backup piston.

2. Description of the Related Art

Such a vehicle braking device has been known, for example, from Japanese Patent Application Laid-open No. 4-283157, in which a seal member for sealing a front side of an annular passage is mounted to an outer periphery of a backup piston so as to come into repulsive contact with an inner periphery of a separator, and a seal member for sealing a rear side of the annular passage is mounted to an inner periphery of the sleeve so as to come into repulsive contact with the outer periphery of the backup piston.

In the conventional vehicle braking device, however, the seal member is mounted to the outer periphery of the backup piston so as to seal the front side of the annular passage, and thus an axial length of the separator has to be set relatively long in order to secure a portion with which the seal member that advances along with the backup piston comes into slide contact when the backup piston advances so as to directly press the master piston, thereby relatively increasing an axial length of a casing to increase the size of the vehicle braking device.

SUMMARY OF THE INVENTION

The present invention has been achieved in view of such circumstances, and has an object to provide a vehicle braking device that is small in an axial direction.

In order to achieve the above object, according to a first feature of the present invention there is provided a vehicle braking device comprising: a master cylinder in which a master piston having a rear surface facing a booster fluid pressure working chamber is slidably housed in a casing; pressure regulating valve means for regulating output fluid pressure from a fluid pressure generation source to fluid pressure corresponding to a brake operation input from a brake operation member to cause the fluid pressure to act on the booster fluid pressure working chamber; a backup piston that has a closed front end facing the booster fluid pressure working chamber and is slidably housed in the casing so as to directly press the master piston from behind corresponding to an operation of the brake operation member when the output fluid pressure from the fluid pressure generation source is reduced; a short cylindrical separator fluid-tightly fitted and secured to the casing so that a front outer periphery of the backup piston is slidably fitted to the short cylindrical separator; and a cylindrical sleeve that forms a channel between the cylindrical sleeve and the separator, forms an annular passage communicating with the channel between the cylindrical sleeve and an outer periphery of the backup piston, and is fluid-tightly fitted and secured to the casing backward of the separator, annular seal members for sealing front and rear sides of the annular passage being mounted between the separator and the backup piston, and between the sleeve and the backup piston, wherein the seal member for sealing a front side of the annular passage is mounted to an inner periphery of the separator so as to come into repulsive contact with the outer periphery of the backup piston; and the seal member for sealing a rear side of the annular passage is mounted to the outer periphery of the backup piston so as to come into repulsive contact with an inner periphery of the sleeve.

With the first feature of the present invention, the seal member for sealing the front side of the annular passage is mounted to the inner periphery of the separator so as to come into repulsive contact with the outer periphery of the backup piston. Thus, even if the backup piston advances so as to directly press the master piston, the seal member for sealing between the backup piston and the separator is not moved, thereby allowing an axial length of the separator to be set short and further allowing an axial length of the casing to be set short to contribute to a reduction of an axial size of the entire vehicle braking device.

According to a second feature of the present invention, in addition to the first feature, the sleeve has a inner diameter which is larger than the separator and constant over an entire axial length thereof, and the backup piston includes a small diameter portion that forms the annular passage between the backup piston and the inner periphery of the sleeve and is slidably fitted to the separator, and a large diameter potion that has a diameter larger than the small diameter portion and is slidably fitted to the sleeve, so that the backup piston has a stepped cylindrical shape. With this arrangement, the annular passage can be easily formed.

According to a third feature of the present invention, in addition to the first or second feature, the device further comprises: a control piston which is operated so as to establish a balance between a reaction based on fluid pressure in a booster fluid pressure generation chamber communicating with the booster fluid pressure working chamber and the brake operation input from the brake operation member, and into which a working fluid is introduced; and a stroke simulator that includes repulsive means mounted between the control piston and an input member communicating with the brake operation member and housed in the control piston, and that is configured to seal the working fluid in the control piston in an advance stroke of a predetermined amount or more of the control piston, to thereby prevent advancing movement of the input member relative to the control piston; and a release chamber communicating with a reservoir is formed in the backup piston including the pressure regulating valve means for regulating the output fluid pressure from the fluid pressure generation source corresponding to axial operation of the control piston to cause the fluid pressure to act on the booster fluid pressure generation chamber, the control piston has a bottomed cylindrical shape with an end wall, at a front end thereof, having a front surface facing the release chamber and provided with a through hole, the input member forms a stroke fluid chamber between the input member and the end wall, and is fluid-tightly and slidably fitted to the control piston, and a seat stopper is secured to the backup piston, and comprises a metal retainer and an elastic seal member that comes into repulsive contact with a front surface of the end wall so as to close the through hole in the advance stroke of a predetermined amount or more of the control piston, the elastic seal member abutting against the front surface of the end wall outside the elastic seal member so as to provide a metal touch.

With the third feature, when the through hole at the front end of the control piston is closed in the advance stroke of the predetermined amount or more of the control piston, the stroke member relative to the control piston, thereby suppressing increase in the stroke of the brake operation member that is made invalid by the stroke simulator and the reaction at the time of failure of the fluid pressure generation source. Further, the stroke fluid chamber is formed between the input member fitted to the control piston and the front end wall of the control piston, and the through hole provided in the end wall is closed by the elastic seal member on the side of the backup piston in the advance stroke of the predetermined amount or more of the control piston. Thus, a configuration for sealing the working fluid in the control piston in the advance stroke of the predetermined amount or more of the control piston is simplified; the seat stopper is secured to the backup piston, and includes the metal retainer and the elastic seal member that comes into repulsive contact with the front surface of the end wall so as to close the through hole in the advance stroke of the predetermined amount or more of the control piston, the elastic seal member abutting against the front surface of the end wall outside the elastic seal member so as to provide a metal touch; and a protrusion of the elastic seal member from the retainer and erosion caused by such a protrusion are prevented to increase sealability when the working fluid is sealed in the control piston in the advance stroke of the predetermined amount or more of the control piston.

The foregoing and other objects, features and advantages of the present invention will become more apparent from the following detailed description of a preferred embodiment with reference to the accompanying drawings.

BRIEF DESCRIPTION OF THE DRAWINGS

FIG. 10 shows changes in flow rate of a working fluid caused by opening of the pressure increasing valve.

FIG. 11 shows an action characteristic of the stroke simulator.

DESCRIPTION OF THE PREFERRED EMBODIMENT

Figure 1:
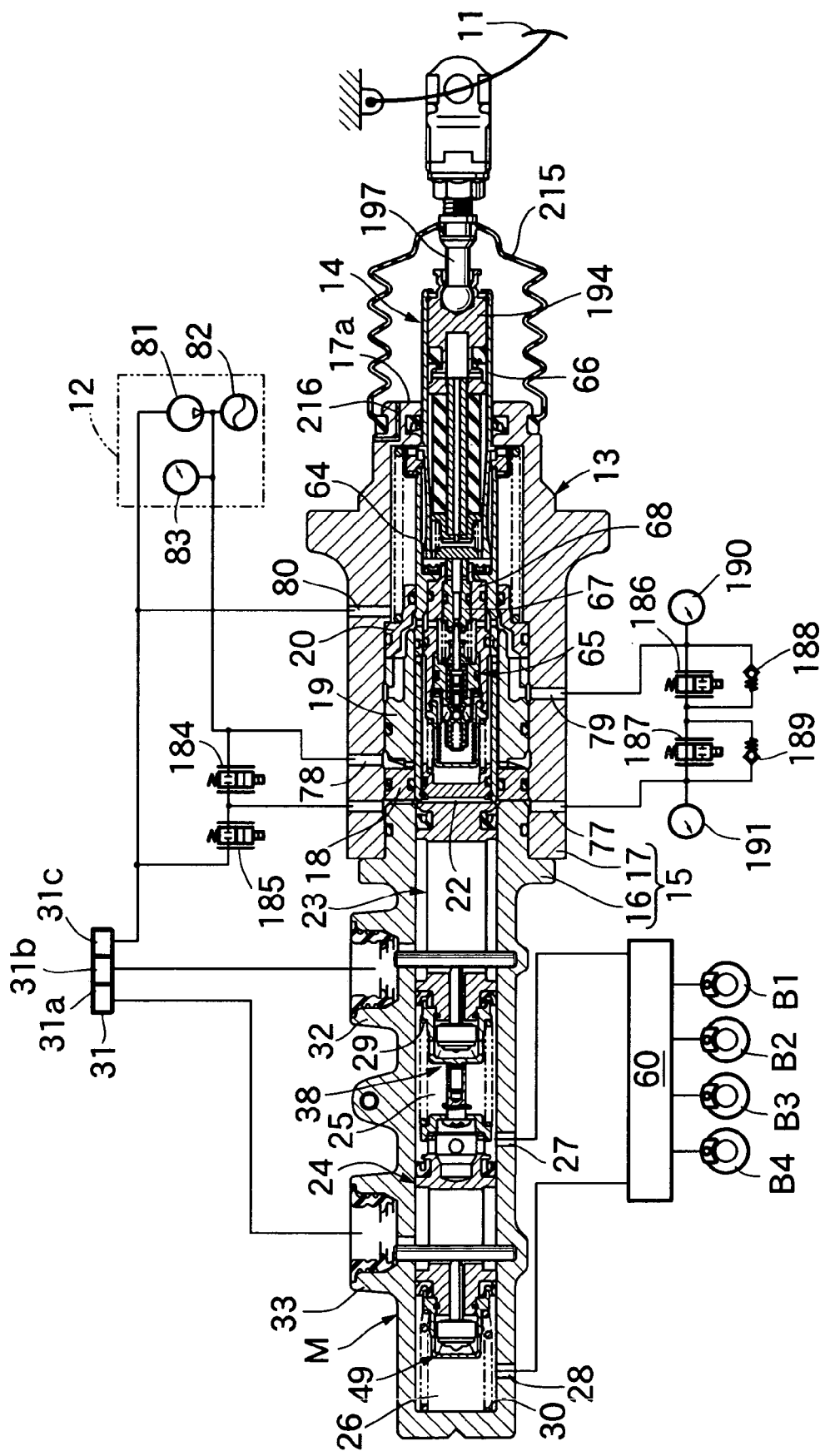
FIG. 1 is a view of a brake fluid pressure system and shows the entire configuration of a vehicle braking device.

First in FIG. 1, a four wheel vehicle braking device includes a tandem type master cylinder M, a fluid pressure booster 13 that regulates fluid pressure in a fluid pressure generation source 12 according to a brake operation force input from brake pedal 11, which is a brake operation member, to act on the master cylinder M, and a stroke simulator 14 mounted between the brake pedal 11 and the fluid pressure booster 13.

A casing 15 common to the master cylinder M and the fluid pressure booster 13 includes: a bottomed cylindrical cylinder body 16 with a closed front end; and a body 17 having a cylindrical shape and an inward flange 17a in a rear end thereof and coaxially connected to a rear portion of the cylinder body 16. A rear end of the cylinder body 16 is fluid-tightly fitted to a front portion of the body 17. A separator 18, a first sleeve 19, and a second sleeve 20 fluid-tightly fitted to the body 17 are held between the rear end of the cylinder body 16 and the body 17 with the first sleeve 19 being held between the separator 18 and the second sleeve 20.

Figure 2:
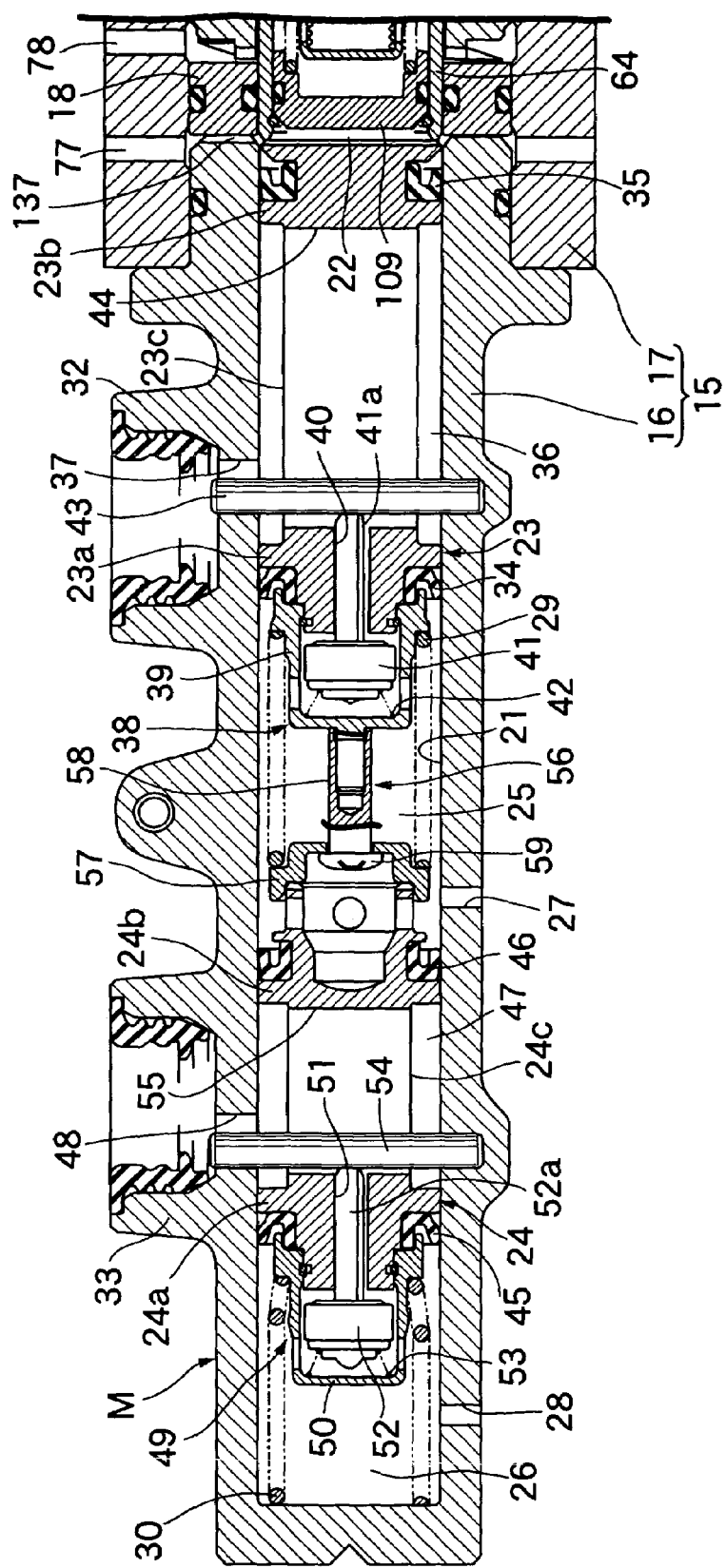
FIG. 2 is an enlarged vertical sectional view of a master cylinder.

Also with reference to FIG. 2, the cylinder body 16 has a first cylinder hole 21 with a closed front end, the master cylinder M includes: a rear master piston 23 having a rear surface facing a booster fluid pressure working chamber 22 and urged backward by a spring; and a front master piston 24 urged backward by a spring and placed forward of the rear master piston 23, the rear master piston 23 and the front master piston 24 being slidably fitted in the first cylinder hole 21. A rear output fluid pressure chamber 25 is formed between the rear master piston 23 and the front master piston 24, and a front output fluid pressure chamber 26 is formed between the closed front end of the cylinder body 16 and the front master piston 24.

The cylinder body 16 has a rear output port 27 communicating with the rear output fluid pressure chamber 25 and a front output port 28 communicating with the front output fluid pressure chamber 26. A rear return spring 29 that urges the rear master piston 23 backward is provided in a compressed manner between the rear master piston 23 and the front master piston 24 in the rear output fluid pressure chamber 25. A front return spring 30 that urges the front master piston 24 backward is provided in a compressed manner between the closed front end of the cylinder body 16 and the front master piston 24 in the front output fluid pressure chamber 26.

A reservoir 31 is annexed to the master cylinder M, and in the reservoir 31, first, second and third reservoir chambers 31a, 31b, and 31c are formed in a partitioned manner. A rear connection cylindrical portion communicating with the second reservoir chamber 31b and a front connection cylindrical portion 33 communicating with the first reservoir chamber 31a are provided integrally with cylinder body 16 so as to protrude upward in positions spaced apart axially of the cylinder body 16.

The rear master piston 23 includes front and rear piston portions 23a and 23b integrally connected via a small diameter connecting portion 23c. A cup seal 34 that allows a working fluid to flow into the rear output fluid pressure chamber 25 and comes into slide contact with an inner surface of the first cylinder hole 21 is mounted to the front piston portion 23a. A cup seal 35 that comes into slide contact with the inner surface of the first cylinder hole 21 is mounted to the rear piston portion 23b.

A rear supply fluid chamber 36 having a ring shape is formed between an outer periphery of the rear master piston 23 and the inner surface of the first cylinder hole 21 and between the front and rear piston portions 23a and 23b, and a supply port 37 normally communicating with the rear supply fluid chamber 36 and opening into the rear connection cylindrical portion 32 is bored in the cylinder body 16, so that a brake fluid supplied from the second reservoir chamber 31b of the reservoir 31 is fed to the rear supply fluid chamber 36.

A center valve 38 is mounted to the rear master piston 23 that provides communication between the rear output fluid pressure chamber 25 and the rear supply fluid chamber 36 when the rear master piston 23 returns to a retraction limit position.

The center valve 38 includes a valve casing 39 coaxially mounted to a front end of the rear master piston 23, an axial passage 40 that communicates with the rear supply fluid chamber 36, is coaxially bored in the front piston portion 23a of the rear master piston 23, and opens into the front end of the front piston portion 23a in the valve casing 39, a valve body 41 that can close a front end opening of the axial passage 40 and is housed in the valve casing 39 movably forward and backward, a valve spring 42 that exerts a spring force for urging the valve body 41 backward, that is, in a closing direction of the axial passage 40 and is housed in the valve casing 39, and a stopper pin 43 that holds the valve body 41 in an advanced position against an urging force of the valve spring 42 when the rear master piston 23 is at the retraction limit, and allows retraction, that is, closing of the valve body 41 by the valve spring 42 at the time of advance of the rear master piston 23.

A long through hole 44 axially of the small diameter connecting portion 23c is provided in the small diameter connecting portion 23c of the rear master piston 23 along one diameter line of the small diameter connecting portion 23c, and opposite ends of the through hole 44 communicate with the rear supply fluid chamber 36. The stopper pin 43 is secured to the cylinder body 16 and passes through the through hole 44, and a rear end of a valve stem 41a connected to the valve body 41 and inserted into the axial passage 40 abuts against the stopper pin 43.

With such a center valve 38, when the rear master piston 23 is at the retraction limit, the valve stem 41a is pressed by the stopper pin 43, and thus the valve body 41 is brought to a position for opening the axial passage 40, so that the axial passage 40 opens to provide communication between the rear output fluid pressure chamber 25 and the through hole 44, thereby supplying a supply fluid from the rear supply fluid chamber 36 to the rear output fluid pressure chamber 25. When the rear master piston 23 advances from the retraction limit, the stopper pin 43 is moved relative to the rear master piston 23 so as to be placed backward of the through hole 44, and thus the valve body 41 is moved to a position for closing the axial passage 40 by a spring force of the valve body 42 to block the communication between the rear supply fluid chamber 36 and the rear output fluid pressure chamber 25.

The front master piston 24 includes front and rear piston portions 24a and 24b integrally connected via a small diameter connecting portion 24c. A cup seal 45 that allows the working fluid to flow into the front output fluid pressure chamber 26 and comes into slide contact with the inner surface of the first cylinder hole 21 is mounted to the front piston portion 24a. A cup seal 46 that comes into slide contact with an inner surface of the first cylinder hole 21 is mounted to the rear piston portion 24b.

A front supply fluid chamber 47 having a ring shape is formed between an outer periphery of the front master piston 24 and the inner surface of the first cylinder hole 21 and between the front and rear piston portions 24a and 24b, and a supply port 48 normally communicating with the front supply fluid chamber 47 and opening into the front connection cylindrical portion 33 is bored in the cylinder body 16, so that a brake fluid supplied from the first reservoir chamber 31a of the reservoir 31 is fed to the front supply fluid chamber 47.

A center valve 49 is mounted to the front master piston 24 that provides communication between the front output fluid pressure chamber 26 and the front supply fluid chamber 47 when the front master piston 24 returns to a retraction limit position.

The center valve 49 includes: a valve casing 50 coaxially mounted to a front end of the front master piston 24; an axial passage 51 that communicates with the front supply fluid chamber 47, is coaxially bored in the front piston portion 24a of the front master piston 24, and opens into the front end of the front piston portion 24a in the valve casing 50; a valve body 52 that can close a front end opening of the axial passage 51 and is housed in the valve casing 50 movably forward and backward; a valve spring 53 that exerts a spring force for urging the valve body 52 backward, that is, in a closing direction of the axial passage 51 and is housed in the valve casing 50; and a stopper pin 54 that holds the valve body 52 in an advanced position against the urging force of the valve spring 53 when the front master piston 24 is at the retraction limit, and allows retraction, that is, closing of the valve body 52 by the valve spring 53 at the time of advance of the front master piston 24.

A long through hole 55 axially of the small diameter connecting portion 24c is provided in the small diameter connecting portion 24c of the front master piston 24 along one diameter line of the small diameter connecting portion 24c, and opposite ends of the through hole 55 communicate with the front supply fluid chamber 47. The stopper pin 54 is secured to the cylinder body 16 and passes through the through hole 55, and a rear end of a valve stem 52a connected to the valve body 52 and inserted into the axial passage 51 abuts against the stopper pin 54.

With such a center valve 49, when the front master piston 24 is at the retraction limit, the valve stem 52a is pressed by the stopper pin 54, and the valve body 52 is brought to a position for opening the axial passage 51, so that the axial passage 51 opens to provide communication between the front output fluid pressure chamber 26 and the through hole 55, thereby supplying a supply fluid from the front supply fluid chamber 47 to the front output fluid pressure chamber 26. When the front master piston 24 advances from the retraction limit, the stopper pin 54 is moved relative to the front master piston 24 so as to be placed backward of the through hole 55, and thus the valve body 52 is moved to a position for closing the axial passage 51 by a spring force of the valve body 53 to block the communication between the front supply fluid chamber 47 and the front output fluid pressure chamber 26.

Specifically, the master cylinder M is of a center valve type in which the center valves 38 and 49 are mounted to the rear master piston 23 and the front master piston 24, and open to supply the brake fluid from the reservoir 31 to the rear and front output fluid pressure chambers 25 and 26 at the time of retraction of the rear master piston 23 and the front master piston 24.

A maximum space restricting means 56 that restricts a maximum space between the rear and front master pistons 23 and 24 are provided between the master pistons 23 and 24. The maximum space restricting means 56 includes a retainer 57 that abuts against a rear surface of the rear piston portion 24b in the front master piston 24, a rod 58 that is connected to a middle of a front end of the valve casing 39 in the center valve 38 mounted to the rear master piston 23 and extended forward, and that has a front portion movably inserted into the middle of the retainer 57, and an engaging member 59 screwed into a front end of the rod 58 so as to engage the retainer 57 from the front. Further, the rear return spring 29 is provided in a compressed manner between the valve casing 39 and the retainer 57, and the retainer 57 is substantially secured to the front master piston 24.

With such a maximum space restricting means 56, the engaging member 59 engages the middle of the retainer 57 from the front to restrict the maximum space between the rear and front master pistons 23 and 24.

Returning to FIG. 1, the rear output port 27 in the master cylinder M is connected to a right front wheel brake B1 and a left rear wheel brake B2 via a fluid pressure modulator 60, and the front output port 28 is connected to a left front wheel brake B3 and a right rear wheel brake B4 via the fluid pressure modulator 60. The fluid pressure modulator 60 is a known one that can freely control brake fluid pressure output from the rear and front output ports 27 and 28 to perform anti-lock brake control at the time of brake operation and perform automatic brake control such as traction control in a non-braking operation state.

Figure 3:
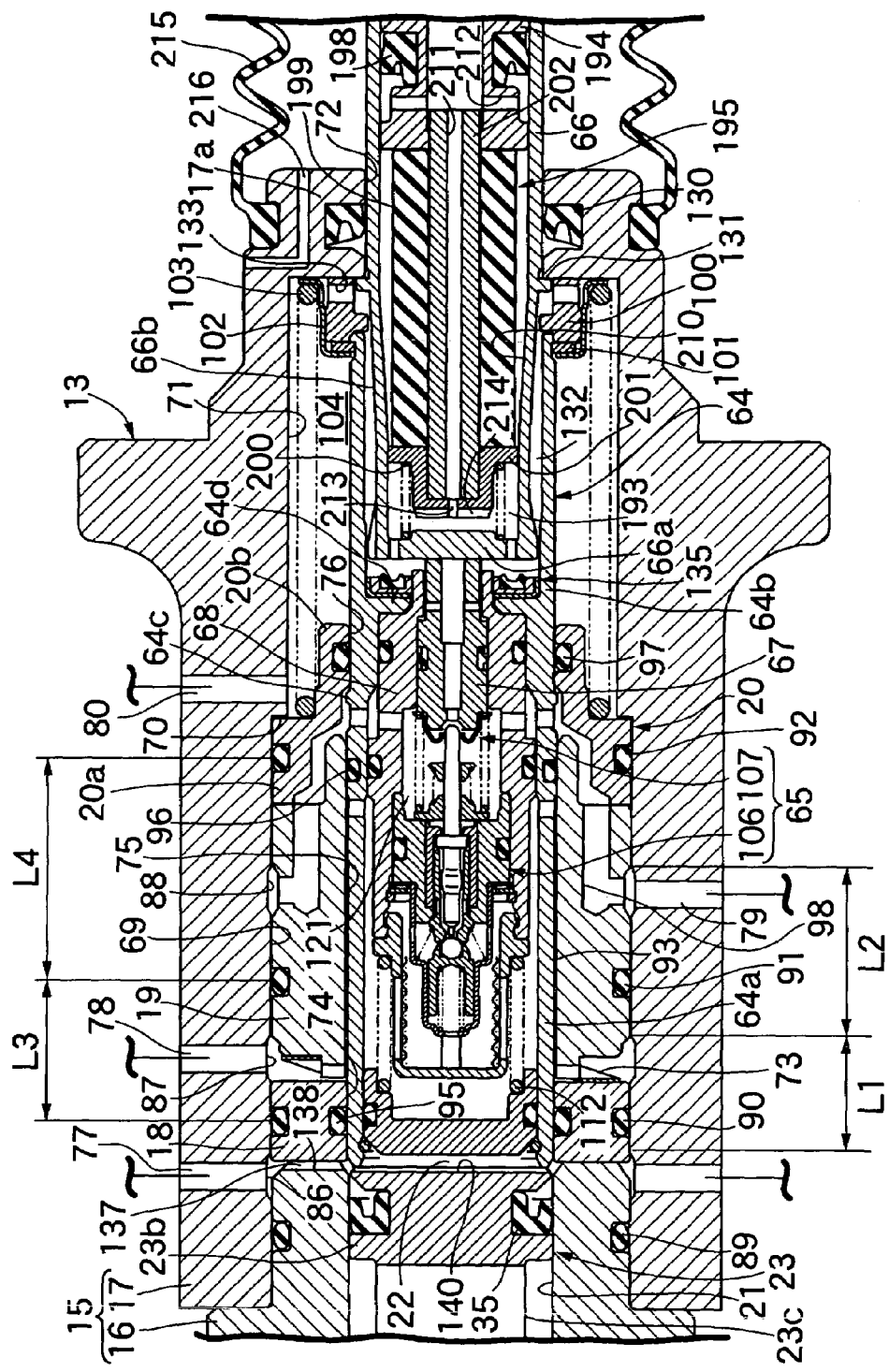
FIG. 3 is a vertical sectional view of a fluid pressure booster and a stroke simulator.

In FIG. 3, the fluid pressure booster 13 includes a cylindrical backup piston 64 that has a front end facing the booster fluid pressure working chamber 22 and is slidably housed in the body 17 of the casing 15, pressure regulating valve means 65 constituted by a pressure increasing valve 106 and a pressure reducing valve 107 and built in the backup piston 64, a control piston 66 that causes the pressure regulating valve means 65 to regulate pressure and establishes a balance between reaction based on fluid pressure in a booster fluid pressure generation chamber 121 connected to the booster fluid pressure working chamber 22 and the brake operation input that is input from the brake pedal 11, a first reaction piston 67 that is mounted between the pressure regulating valve means 65 and the control piston 66 so as to apply the reaction based on the fluid pressure in the booster fluid pressure generation chamber 121 to the control piston 66, and a second reaction piston 68 mounted between the backup piston 64 and the first reaction piston 67 so as to apply reaction caused by output fluid pressure from the fluid pressure generation source 12 and reaction by a reaction spring 112 to the control piston 66 in addition to the reaction from the first reaction piston 67 when the brake operation input by the brake pedal 11 is increased.

The body 17 that constitutes part of the casing 15 and is coaxially connected to the rear portion of the cylinder body 16 includes: a large diameter hole 69 that fluid-tightly fits the rear end of the cylinder body 16, the separator 18, the first sleeve 19, and the second sleeve 20 from the front end; and a medium diameter hole 71 that forms an annular step 70 with a rear end of the large diameter hole 69, is coaxially connected to the rear end of the large diameter hole 69, and has a smaller diameter than the large diameter hole 69. The inward flange 17a provided in the rear end of the body 17 so as to define a rear end of the medium diameter hole 71 forms a small diameter hole 72 having a smaller diameter than the medium diameter hole 71.

The separator 18, the first sleeve 19, and the second sleeve 20 are fluid-tightly fitted in the large diameter hole 69 so as to be held between the rear end of the cylinder body 16 of the master cylinder M and the step 70 with a leaf spring 73 being mounted between the separator 18 and the first sleeve 19. Thus, the separator 18, the first sleeve 19, and the second sleeve 20 are reliably secured to the front portion of the body 17 while absorbing dimensional tolerance to a distance between the rear end of the cylinder body 16 and the step 70 by a spring force exerted by the leaf spring 73.

The separator 18 has a short cylindrical shape and an inner periphery that forms a second cylinder hole 74 having a slightly smaller diameter than the first cylinder hole 21 of the cylinder body 16 of the master cylinder M. The first sleeve 19 has a cylindrical shape that forms a third cylinder hole 75 having the same diameter as the first cylinder hole 21. Further, the second sleeve 20 has a stepped cylindrical shape and integrally includes a large diameter potion 20a fitted in the large diameter hole 69 of the body 17, and a small diameter portion 20b that forms a fourth cylinder hole 76 having a slightly smaller diameter than the second cylinder hole 74 and extends backward from the large diameter potion 20a. The rear end of the small diameter potion 20a abuts against the step 70. Thus, the separator 18, the first sleeve 19, and the second sleeve 20 fluid-tightly fitted and secured in the body 17 form, sequentially from the front, the second to fourth cylinder holes 74, 75 and 76 coaxial with the first cylinder hole 21.

The backup piston 64 integrally includes a front small diameter portion 64a slidably fitted in the second cylinder hole 74, a rear small diameter portion 64b having a slightly smaller outer diameter than the front small diameter portion 64a and slidably fitted in the fourth cylinder hole 76, and a middle large diameter potion 64c that connects the front small diameter portion 64a and the rear small diameter portion 64b and that is inserted into the third cylinder hole 75 with a gap. The backup piston 64 has a stepped cylindrical shape with the middle large diameter potion 64c having a diameter larger than those of the front small diameter portion 64a and the rear small diameter portion 64b.

The body 17 has a connection port 77 opening into an inner surface of the large diameter hole 69 in a position corresponding to a portion between the cylinder body 16 of the master cylinder M and the separator 18, an input port 78 opening into the inner surface of the large diameter hole 69 in a position corresponding to a portion between the separator 18 and the first sleeve 19, an output port 79 opening into the inner surface of the large diameter hole 69 in an axially middle portion of the first sleeve 19, and a release port 80 opening into a front inner surface of the medium diameter hole 71, which are provided sequentially from the front with spaces therebetween.

As shown in FIG. 1, the fluid pressure generation source 12 is connected to the input port 78. The fluid pressure generation source 12 includes: a pump 81 for drawing up the working fluid from the third reservoir chamber 31c of the reservoir 31; an accumulator 82 connected to a discharge side of the pump 81; and a fluid pressure sensor 83 for detecting fluid pressure of the accumulator 82 to control actuation of the pump 81. A constant high fluid pressure is fed from the fluid pressure generation source 12 to the input port 78. The release port 80 is connected to the third reservoir chamber 31c of the reservoir 31.

The inner surface of the large diameter hole 69 in the body 17 has an annular recess 86 that opens an inner end of the connection port 77, an annular recess 87 that opens an inner end of the input port 78, and an annular recess 88 that opens an inner end of the output port 79. O rings 89, 90, 91, and 92 that are annular seal members that seal the annular recesses 86, 87, and 88 from opposite sides are mounted to outer peripheries of the cylinder body 16 of the master cylinder M, the separator 18, the first sleeve 19, and the second sleeve 20. Specifically, the O rings 89 and 90 that seal the annular recess 86 from opposite sides are mounted to the outer peripheries of the cylinder body 16 and the separator 18 so as to come into repulsive contact with the inner surface of the large diameter hole 69. The O ring 91 that holds the annular recess 87 with the O ring 90 is mounted to the outer periphery of the first sleeve 19 so as to come into repulsive contact with the inner surface of the large diameter hole 69. The O ring 92 that holds the annular recess 88 with the O ring 91 is mounted to the outer periphery of the large diameter potion 20a in the second sleeve 20 so as to come into repulsive contact with the inner surface of the large diameter hole 69.

When the separator 18, the first sleeve 19, and the second sleeve 20 are fitted in the large diameter hole 69, the O ring 92 mounted to the outer periphery of the second sleeve 20 needs to pass over the annular recesses 86 to 88, the O ring 91 mounted to the outer periphery of the first sleeve 19 needs to pass over the annular recesses 86 and 87, and the O ring 90 mounted to the outer periphery of the separator 18 needs to pass over the annular recess 86. If two or more O rings among the three O rings 90 to 92 simultaneously pass through a plurality of front edges in a fitting direction of the annular recesses 86 to 88, fitting of the separator 18, the first sleeve 19, and the second sleeve 20 needs a large force, and an excessive force may damage the O rings 90 to 92, thereby affecting assemblability.

Thus, spaces L1 and L2 between the front edges of the annular recesses 86 to 88 in the direction of fitting the separator 18, the first sleeve 19, and the second sleeve 20 into the body 17 are set to values that prevent the plurality of O rings 90 to 92 from simultaneously passing over the front edges when the separator 18, the first sleeve 19, and the second sleeve 20 are fitted into the body 17. In the embodiment, the space L1 between the front edges of the annular recesses 86 and 87 is set to a smaller value than a space L3 between the O rings 90 and 91, and the space L2 between the front edges of the annular recesses 87 and 88 is set to a smaller value than a space L4 between the O rings 91 and 92.

Figure 4:
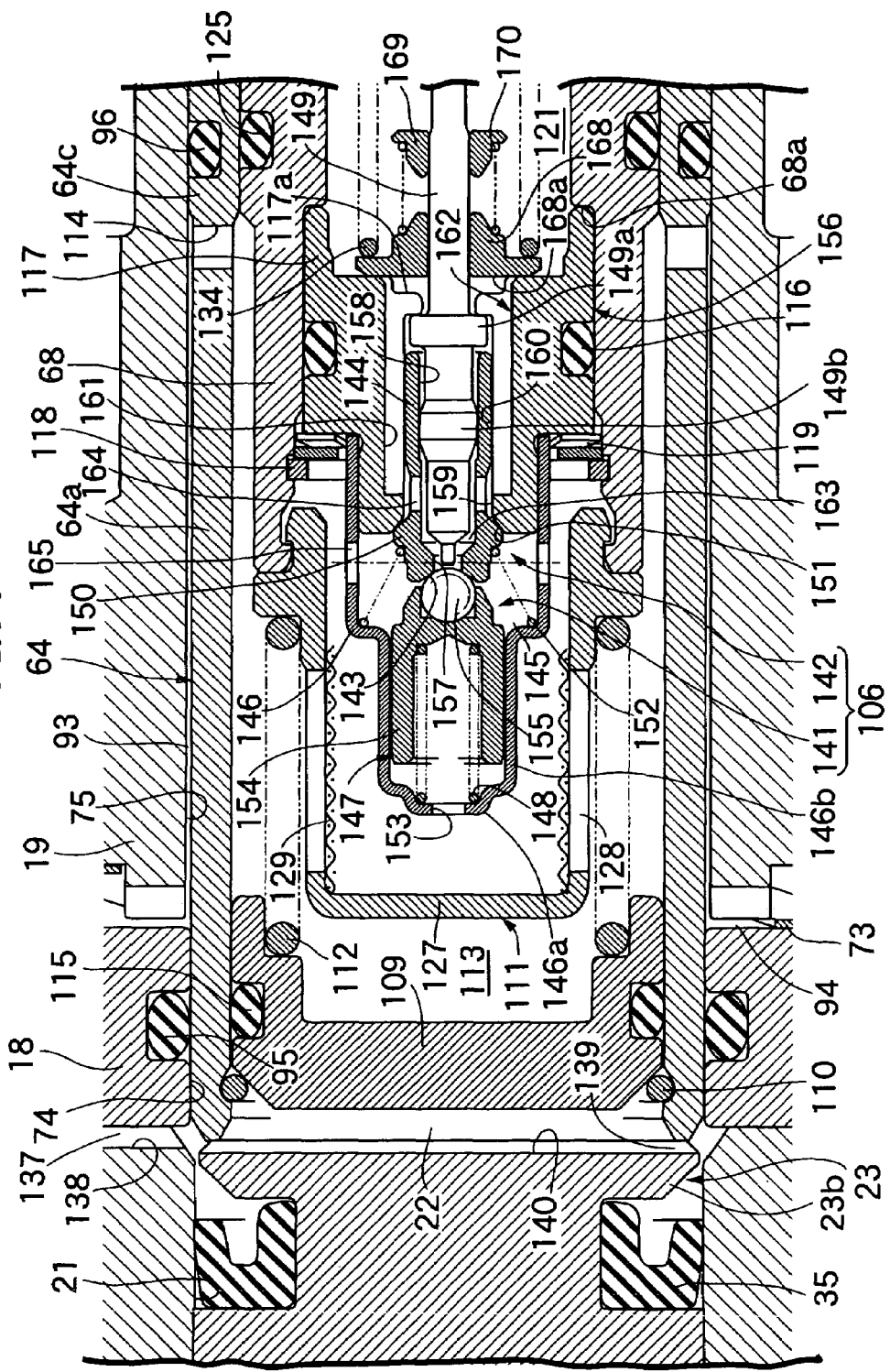
FIG. 4 is an enlarged vertical sectional view of a pressure increasing valve and therearound that is part of the fluid pressure booster in a closed state.

Also with reference to FIG. 4, the front small diameter portion 64a in the backup piston 64 is fluid-tightly and slidably fitted in the second cylinder hole 74 of the separator 18, the middle large diameter potion 64c of the backup piston 64 is fluid-tightly and slidably fitted in the third cylinder hole 75 of the first sleeve 19, an annular passage 93 is formed between the outer periphery of the front small diameter portion 64a and the inner periphery of the first sleeve 19, a channel 94 communicating with the annular passage 93 is formed between the separator 18 and the first sleeve 19, so that the channel 94 provides communication between the annular recess 87 communicating with the input port 78 and the annular passage 93.

Further, front and rear sides of the annular passage 93 are sealed by an O ring 95 that is an annular seal member mounted between the separator 18 and the backup piston 64, and an O ring 96 that is an annular seal member mounted between the first sleeve 19 and the backup piston 64. The O ring 95 is mounted to the inner surface of the separator 18, that is, the inner surface of the second cylinder hole 74 so as to come into repulsive slide contact with the outer periphery of the front small diameter portion 64a in the backup piston 64. The O ring 96 is mounted to the outer surface of the middle large diameter potion 64c in the backup piston 64 so as to come into repulsive contact with the inner surface of the third cylinder hole 75, that is, the inner periphery of the first sleeve 19.

Figure 5:
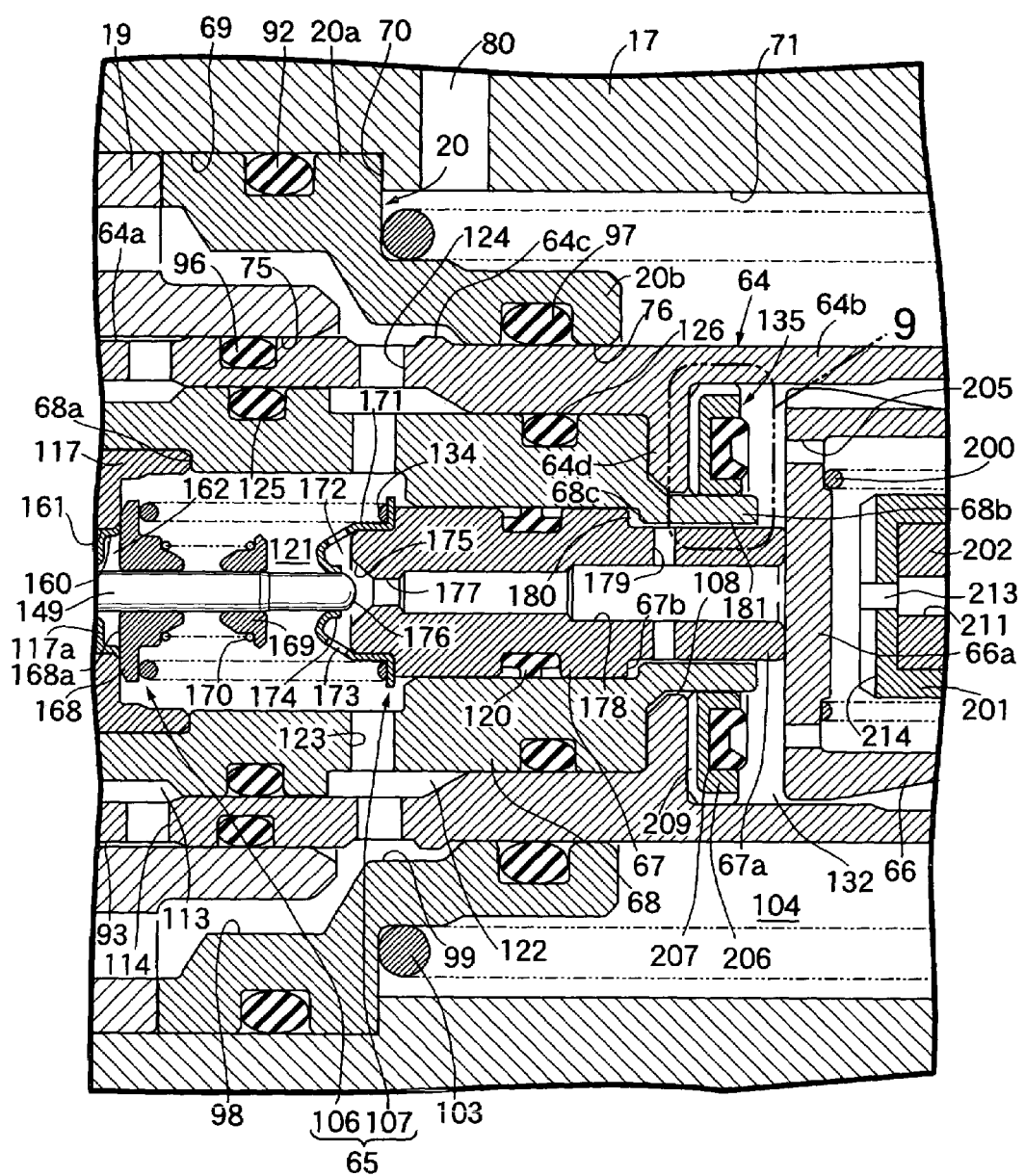
FIG. 5 is an enlarged vertical sectional view of a pressure reducing valve and therearound that is part of the fluid pressure booster in an open state.

Also with reference to FIG. 5, an O ring 97 that comes into repulsive contact with the outer periphery of the rear small diameter portion 64b in the backup piston 64 is mounted to the inner periphery of the small diameter portion 20b in the second sleeve 20, that is, the inner surface of the fourth cylinder hole 76. On the other hand, a channel 98 having an outer end communicating with the annular recess 88 provided in the inner surface of the body 17 so as to communicate with the output port 79 is provided in the first and second sleeves 19 and 20. An annular recess 99 communicating with the channel 98 is formed in the inner periphery of the first sleeve 19 and the inner periphery of the small diameter portion 20b in the second sleeve 20 between the first and second sleeves 19 and 20. Front and rear sides of the annular recess 99 are sealed by the O rings 96 and 97.

On the other hand, as shown in FIG. 3, a ring-shaped stopper 100 abuts against the inward flange 17a in the body 17, a coil spring 103 surrounding a rear half of the backup piston 64 is provided in a compressed manner between a retainer 102 and the second sleeve 20, the retainer 102 having an inner periphery that abuts against and engages, from the front, a snap ring 101 mounted to the outer periphery of the rear end of the rear small diameter portion 64b in the backup piston 64. The backup piston 64 is urged backward by a spring force of the spring 103. Thus, the position where the snap ring 101 abuts against the stopper 100 that abuts against the inward flange 17a in the body 17 is a retraction limit of the backup piston 64, the front end of the backup piston 64 at the retraction limit faces the booster fluid pressure working chamber 22, and abuts against the entire outer peripheral edge of the rear surface of the rear master piston 23 in a non-operation state, and in this state, the rear master piston 23 is at the retraction limit.

As clearly shown in FIG. 4, a groove 138 radially extending so as to form a passage 137 with the front end of the body 17 that abuts against the rear end of the cylinder body 16 is provided in an upper portion of the rear end of the cylinder body 16 of the master cylinder M, and the passage 137 provides communication between the annular recess 86 communicating with the connection port 77 and the booster fluid pressure working chamber 22. A groove 140 is provided in the rear end of the rear master piston 23 so as to form a passage 139 for leading booster fluid pressure to between the rear surface of the master piston 23 and the front end of the backup piston 64, with the front end of the backup piston 64 that abuts against the rear end of the master piston 23. The groove 140 is formed to extend along one diameter line of the rear master piston 23 in parallel with an axis of the through hole 44 provided in the rear master piston 23, that is, an axis of the stopper pin 43.

Thus, the connection port 77 communicates with the booster fluid pressure working chamber 22 via the annular recess 86 and the passage 137, and the passage 139 causes the fluid pressure in the booster fluid pressure working chamber 22 to act on a portion between the rear master piston 23 and the backup piston 64 in a state in which the backup piston 64 abuts against the rear master piston 23.

Between the second sleeve 20 and the inward flange 17a in the body 17, a spring chamber 104 is formed that surrounds the backup piston 64 so as to house the spring 103, and the spring chamber 104 communicates with the release port 80. The O ring 97 seals a portion between the spring chamber 104 and the annular recess 99 communicating with the output port 79.

An inward flange 64d protruding radially inward is integrally provided in the inner surface of the axially middle portion of the backup piston 64, and an insertion hole 108 coaxial with the backup piston 64 is formed in the inner periphery of the inward flange 64d. The stepped cylindrical second reaction piston 68 is slidably fitted to the backup piston 64 forward of the inward flange 64d, and the first reaction piston 67 is coaxially and relatively slidably fitted to the reaction piston 68.

An end wall member 109 having a front surface facing the booster fluid pressure working chamber 22 is fluid-tightly fitted to the front end of the backup piston 64, and a snap ring 110 that abuts against and engages an outer peripheral edge of the end wall member 109 from the front is mounted to the inner periphery of the front end of the backup piston 64. Further, a filter 111, in which a mesh member 129 is provided in an inner surface of a filter frame 127 having a plurality of openings 128 in a circumferential direction and a bottomed cylindrical shape, is mounted to the front end of the second reaction piston 68, and the second reaction piston 68 is urged to abut against the inward flange 64d from the front by the spring force of the reaction spring 112 provided in a compressed manner between the filter 111 and the end wall member 109.

An input chamber 113 is formed in the backup piston 64 between the second reaction piston 68 and the filter 111 and the end wall member 109, and the input chamber 113 communicates with the annular passage 93 via a communication hole 114 provided in the backup piston 64. Specifically, the high pressure working fluid from the fluid pressure generation source 12 is introduced into the input chamber 113, and an O ring 115 is mounted to an outer periphery of the end wall member 109 to seal between the input chamber 113 and the booster fluid pressure working chamber 22 and come into repulsive contact with the inner periphery of the backup piston 64.

An annular step 68a facing forward is provided in the inner surface of the middle of the second reaction piston 68, a stepped cylindrical valve seat member 117 having, in an outer periphery thereof, an O ring 116 that comes into repulsive contact with the inner periphery of the second reaction piston 68 is fitted to the front portion of the second reaction piston 68 so as to abut against the step 68a, and a leaf spring 119 is provided between the valve seat member 117 and a snap ring 118 mounted to the inner periphery of the second reaction piston 68 forward of the valve seat member 117. Thus, the valve seat member 117 is fluid-tightly fitted and secured to the front portion of the second reaction piston 68, and supported by the backup piston 64 via the second reaction piston 68.

On the other hand, the first reaction piston 67 has, in the outer periphery thereof, an annular seal member 120 that comes into repulsive contact with the inner periphery of the rear portion of the second reaction piston 68, and is slidably fitted to the front portion of the second reaction piston 68. The booster fluid pressure generation chamber 121 is formed in the second reaction piston 68 so as to face the rear surface of the valve seat member 117 and the front end of the first reaction piston 67. An annular chamber 122 is formed between the outer periphery of the second reaction piston 68 and the inner periphery of the backup piston 64. The booster fluid pressure generation chamber 121 communicates with the annular chamber 122 via a communication hole 123 provided in the second reaction piston 68. Further, a communication hole 124 that provides communication between the annular chamber 122 and the annular recess 99 is provided in the middle large diameter potion 64c in the backup piston 64. The booster fluid pressure generation chamber 121 communicates with the output port 79 via the communication hole 123, the annular chamber 122, the communication hole 124, the annular recess 99, and the channel 98. Further, O rings 125 and 126 that hold the annular chamber 122 from the front and back is mounted to the outer periphery of the second reaction piston 68 so as to come into repulsive contact with the inner periphery of the backup piston 64.

Figure 6:
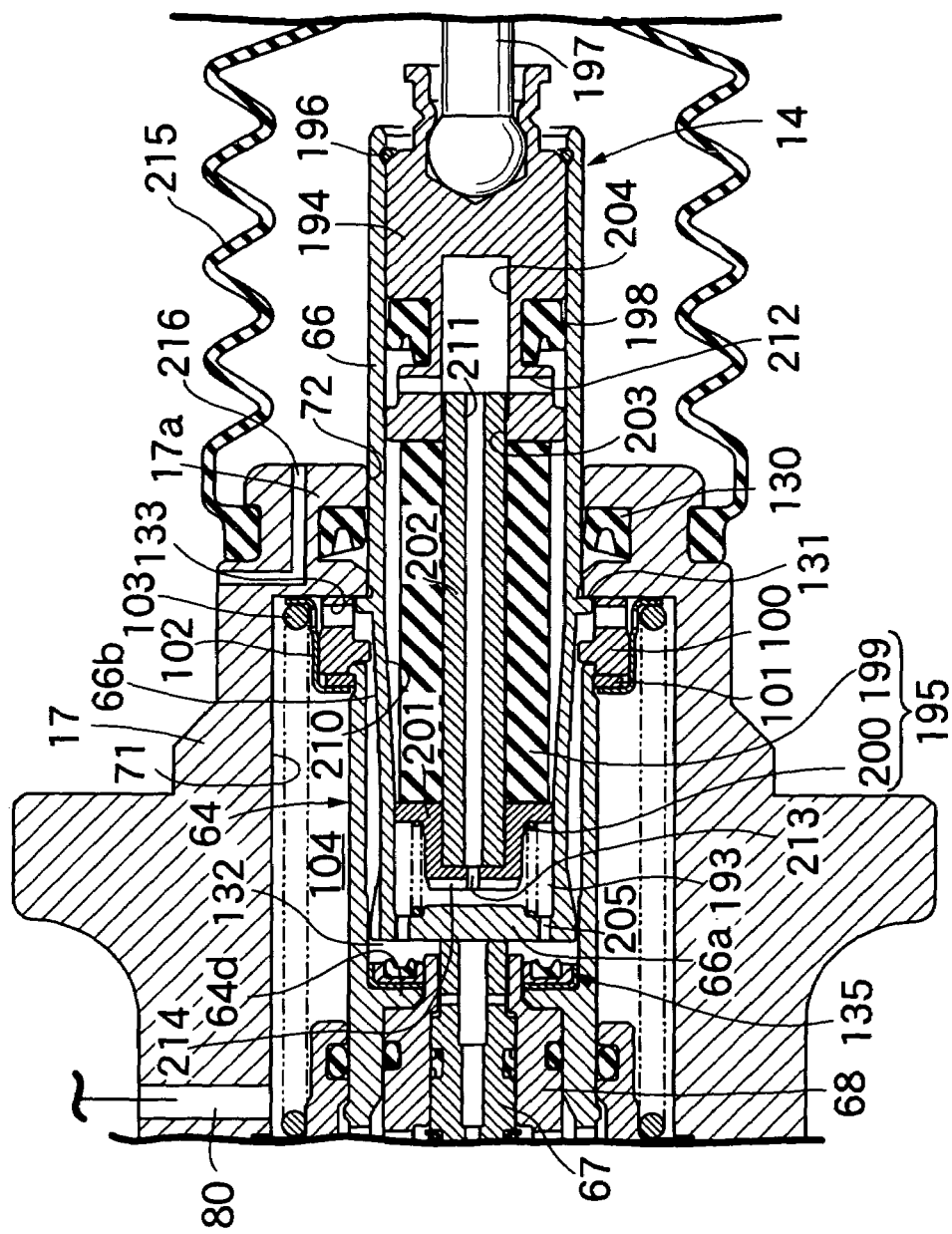
FIG. 6 is an enlarged vertical sectional view of a control piston and a stroke simulator.

In FIG. 6, the control piston 66 has a bottomed cylindrical shape with an end wall 66a at a front end thereof, and is slidably fitted in the small diameter hole 72 formed by the inward flange 17a in the rear end of the body 17 and coaxially inserted into the rear small diameter portion 64b in the backup piston 64. Further, an annular seal member 130 that comes into repulsive contact with the outer periphery of the control piston 66 is mounted to the inner periphery of the inward flange 17a, that is, the inner surface of the small diameter hole 72. A restriction protrusion 131 that abuts against and engages the inner peripheral edge of the inward flange 17a from the front to restrict the retraction limit of the control piston 66 is integrally provided in the outer surface of the control piston 66 in a protruding manner over the entire periphery.

A release chamber 132 is formed in the rear of the inward flange 64d and between the backup piston 64 and the control piston 66. The release chamber 132 communicates with the spring chamber 104 via a communication hole 133 provided in the stopper 100. Specifically, the release chamber 132 communicates with the third reservoir chamber 31c of the reservoir 31 via the communication hole 133, the spring chamber 104, and the release port 80.

The first reaction piston 67 coaxially and integrally includes an extended cylindrical portion 67a extending backward through the insertion hole 108. A rear end of the extended cylindrical portion 67a normally abuts against the end wall 66a of the front end of the control piston 66. A spring 134 is housed in the booster fluid pressure generation chamber 121 so as to exert a spring force for urging the rear end of the first reaction piston 67, that is, the rear end of the extended cylindrical portion 67a to come into contact with the end wall 66a of the control piston 66. The spring force of the spring 134 is set to an extremely small value.

The second reaction piston 68 coaxially and integrally includes an extended cylindrical portion 68b that coaxially surrounds the extended cylindrical portion 67a of the first reaction piston 67 and is inserted into the insertion hole 108. In a state in which the second reaction piston 68 abuts against the inward flange 64d of the backup piston 64 at the retraction limit position, a rear end of the extended cylindrical portion 68b of the second reaction piston 68 is placed backward of a seat stopper 135 that abuts against the inward flange 64d of the backup piston 64 and that is secured to the backup piston 64, and forward of the rear end of the extended cylindrical portion 67a of the first reaction piston 67.

Thus, in an advancing operation of the control piston 66 relative to the backup piston 64, the first reaction piston 67 advances together with the control piston 66, and the rear end of the second reaction piston 68 abuts against the end wall 66a of the front end of the control piston 66 when the brake operation input by the brake pedal 11 is increased and the amount of advancing movement of the control piston 66 becomes larger than a predetermined value.

Returning to FIG. 4, the pressure increasing valve 106 includes first and second valve means 141 and 142 arranged side by side along the axis of the control piston 66 so as to sequentially open according to the increase in the brake operation input from the brake pedal 11. A seal diameter of the second valve means 142 is larger than a seal diameter of the first valve means 141, and the second valve means 142 is designed to start opening before a rate of flow from the opened first valve means 141 reaches maximum.

The first valve means 141 includes: a cylindrical slide member 144 having a first valve seat 143 in a front end thereof; a retainer 146 that forms valve chamber 145 therein that communicates with the input chamber 113 communicating with the fluid pressure generation source 12; a valve body 147 that can be seated on the first valve seat 143 facing the valve chamber 145 and is slidably fitted to the retainer 146; a first valve spring 148 that urges the valve body 147 to be seated on the first valve seat and is provided between the retainer 146 and the valve body 147; and a pressing rod 149 that can abut against the valve body 147, cooperates with and is connected to the control piston 66, and is inserted into the slide member 144 relatively movably in the axial direction.

The second valve means 142 includes: a valve portion 150 provided in the slide member 144 that is the common component shared with the first valve means 141; the stepped cylindrical valve seat member 117 that slidably fits the slide member 144 and has a front end on which a second valve seat 151 is provided; the retainer 146 that is also the component of the first valve means 141; a second valve spring 152 that urges the valve portion 150 to be seated on the second valve seat 151 and is provided between the retainer 146 and the slide member 144; and the pressing rod 149 that is also the component of the first valve means 141.

The slide member 144 and the valve seat member 117 constitute inserted means 156 that is inserted into and supported by the second reaction piston 68 with the slide member 144 being slidably fitted to the valve seat member 117. The second reaction piston 68 is slidably fitted to the backup piston 64, and thus the inserted means 156 is inserted into and supported by the backup piston 64.

The retainer 146 is mounted to the outer periphery of the front end of the valve seat member 117 that constitutes part of the inserted means 156 by press fitting. The valve chamber 145 is formed in the retainer 146 to face the first valve seat 143 in the front end of the slide member 144 and the second valve seat 151 in the front end of the valve seat member 117. A guide cylindrical portion 146b is integrally provided in the front portion of the retainer 146. The retainer 146 has a bottomed cylindrical shape and has, in a front end thereof, an end wall 146a having an open hole 153 communicating with the input chamber 113 in a central part thereof. The valve body 147 of the first valve means 141 is formed by a sphere 155 that can be seated on the first valve seat 143 being secured to a rear portion of a slide member 154 slidably fitted to the guide cylindrical portion 146b. Specifically, the valve body 147 is slidably fitted to the retainer 146, and the first valve spring 148 is provided in a compressed manner between the end wall 146a and the slide member 154.

The slide member 144 coaxially has a first valve hole 157 having a front end opening into a central part of the first valve seat 143, and a slide hole 158 having a diameter larger than the first valve hole 157, a front end communicating with the first valve hole 157, and an open rear end. On the other hand, the valve seat member 117 coaxially has a second valve hole 159 having a front end opening into a central part of the second valve seat 151, and a slide hole 160 having the same diameter as the second valve hole 159, a front end communicating with the second valve hole 159, and an open rear end. The slide member 144 coaxially and movably passes through the second valve hole 159, and is slidably fitted in the slide hole 160.

The pressing rod 149 is slidably fitted in the slide hole 158 of the slide member 144 with the front end thereof being placed in the first valve hole 157. A pressing flange 149a that can abut against the rear end of the slide member 144 to press and move the slide member 144 forward is integrally provided in the pressing rod 149 in the valve seat member 117. A restriction flange 117a that abuts against the pressing flange 149a from behind to restrict a retraction limit of the pressing rod 149 is integrally provided in the valve seat member 117 so as to protrude radially inward from an inner surface of a rear portion of the slide hole 160.

A slide portion 149b that comes into slide contact with an inner surface of the slide hole 158 is provided in the pressing rod 149 forward of the pressing flange 149a. The pressing rod 149 has a small diameter forward of the slide portion 149b so as to form an annular chamber 163 with the inner surface of the slide member 144.

Figure 7:
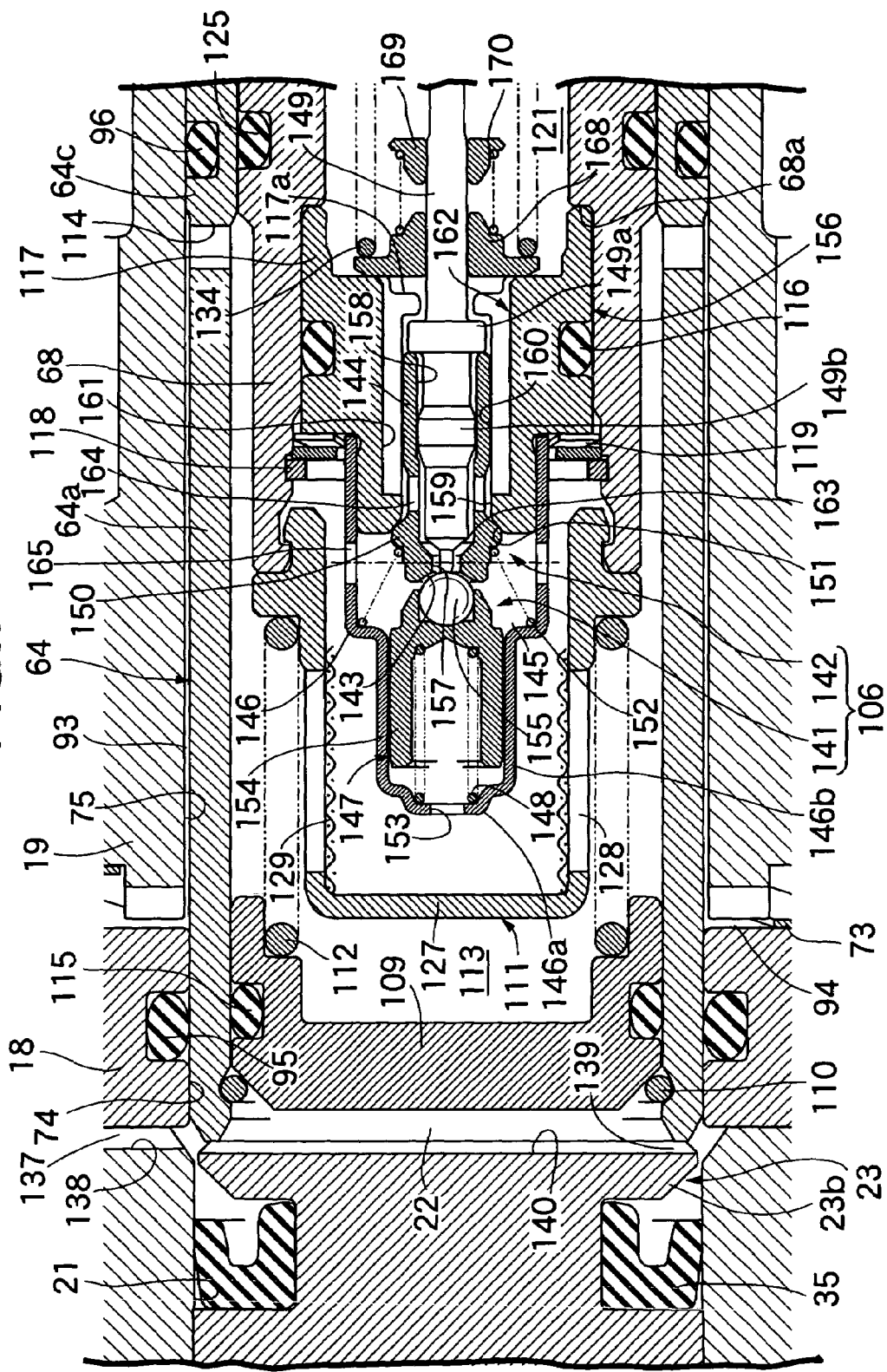
FIG. 7 is a sectional view corresponding to FIG. 4 at the time of opening of a first valve means.

As shown in FIG. 7, when the valve body 147 is pressed by the front end of the pressing rod 149 to separate the valve body 147 from the first valve seat 143, the valve chamber 145 communicates with the annular chamber 163. Further, in a state in which the pressing flange 149a abuts against the restricting step 117a, a distance between the front end of the pressing rod 149 and the valve body 147 is smaller than a distance between the rear end of the slide member 144 and the pressing flange 149a. At the time of advance of the pressing rod 149, the pressing rod 149 further advances after the valve body 147 is separated from the first valve seat 143, and thus the pressing flange 149a further presses the slide member 144 forward.

Figure 8:
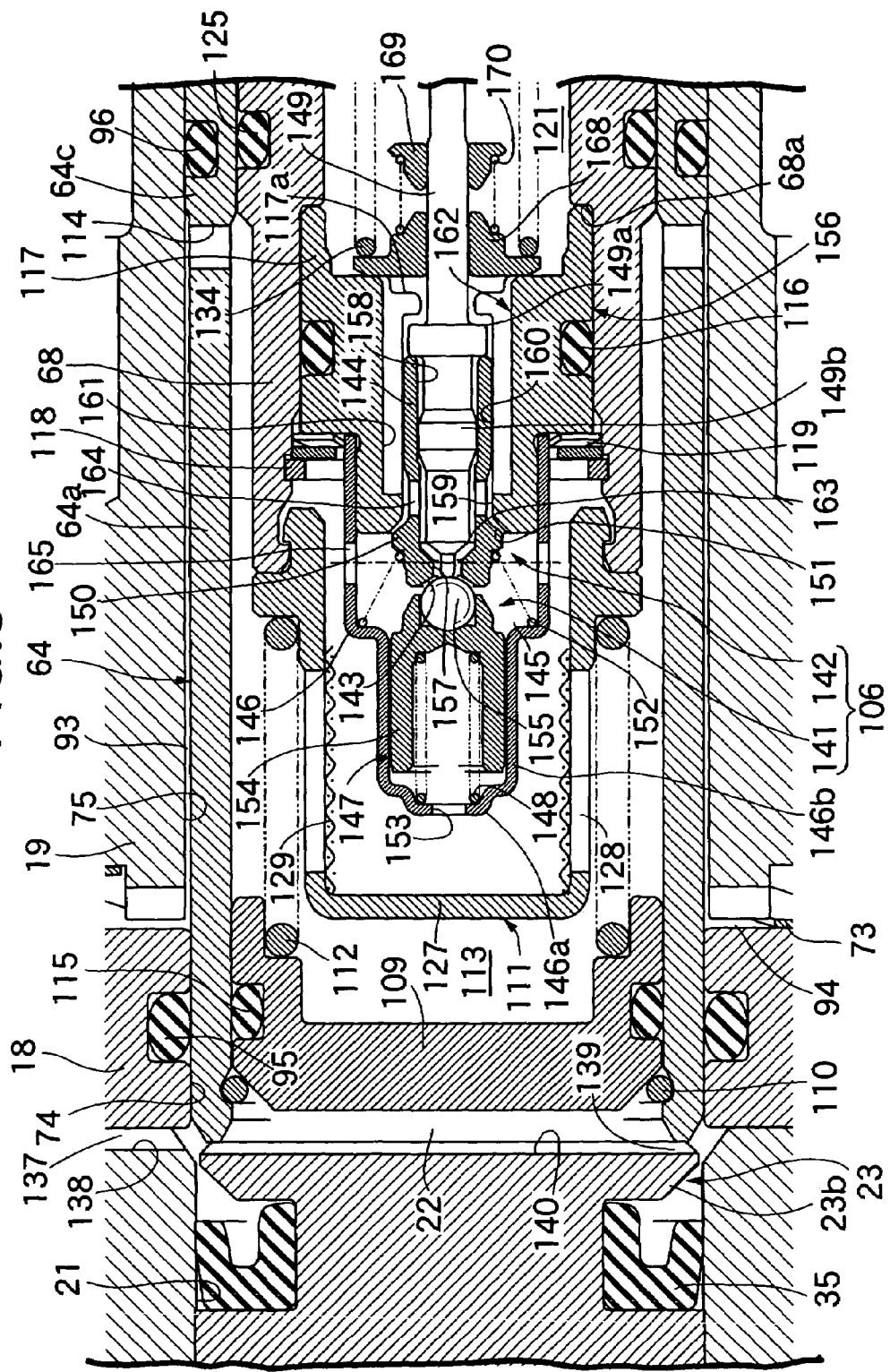
FIG. 8 is a sectional view corresponding to FIG. 4 at the time of opening of a second valve means.

The valve portion 150 of the second valve means 142 is provided in the slide member 144 in the rear of the first valve seat 143, has a seal diameter larger than a seal diameter when the valve body 147 is seated on the first valve seat 143, and can be seated on the second valve seat 151. After the first valve means 141 opens, as shown in FIG. 8, the pressing rod 149 further advances to press the slide member 144 forward, and thus the valve portion 150 is separated from the second valve seat 151 to open the second valve means 142.

A plurality of flow grooves 161 having rear ends opening into the rear end of the valve seat member 117 are provided in the inner surface of the slide hole 160 in the valve seat member 117. A plurality of communication holes 164 that provides communication between the annular chamber 163 and the flow grooves 161 are provided in the slide member 144.

The slide hole 160 and the plurality of flow grooves 161 in the valve seat member 117 form a flow passage 162, and at the time of opening of the first valve means 141, a working fluid flowing from the valve chamber 145 into the annular chamber 163 flows through the flow passage 162 via the communication holes 164 toward the booster fluid pressure generation chamber 121, and at the time of opening of the second valve means 142, the working fluid in the valve chamber 145 flows through the flow passage 162 toward the booster fluid pressure generation chamber 121.

A plurality of communication holes 165 are provided in a side wall of the retainer 146 so as to provide communication between the input chamber 113 communicating with the fluid pressure generation source 12 and the valve chamber 145. The communication holes 165 are provided in the side wall of the retainer 146 so as to be placed on a side opposite from the valve body 147, that is, a rear side relative to a seating position of the valve body 147 on the first valve seat 143 in the first valve means 141.

A rear portion of the pressing rod 149 protrudes into the booster fluid pressure generation chamber 121, and the pressing rod 149 is slidably fitted to a middle of a disk-shaped rectifying member 168 in the booster fluid pressure generation chamber 121. The rectifying member 168 abuts against a surface of the valve seat member 117 facing the booster fluid pressure generation chamber 121 to close an open end of the flow passage 162 opening into the booster fluid pressure generation chamber 121, and an axial movement thereof is guided by the pressing rod 149 only. Further, a surface of the rectifying member 168 facing the flow passage 162 is a flat surface 168a.

With reference to FIG. 5, a spring receiving member 169 is pressed into and secured to the pressing rod 149 backward of the rectifying member 168, and a spring 170 is provided in a compressed manner between the rectifying member 168 and the spring receiving member 169. On the other hand, the front end of the first reaction piston 67 also protrudes into the booster fluid pressure generation chamber 121 coaxially with the pressing rod 149, and the spring 134 is provided in a compressed manner between a retainer 171 that fits and abuts against the front portion of the first reaction piston 67 and the rectifying member 168. Thus, the rectifying member 168 is urged toward the valve seat member 117 by spring forces of the springs 134 and 170. The spring forces of the springs 134 and 170 are set so that the rectifying member 168 can be spaced from the valve seat member 117 according to the fluid pressure from the fluid pressure generation source 12 acting on the flow passage 162 by the opening of the first valve means 141.

The retainer 171 fitted to the front portion of the first reaction piston 67 forms a valve chamber 172 with the first reaction piston 67, and a plurality of communication holes 173 are provided in the retainer 171 so as to provide communication between the booster fluid pressure generation chamber 121 and the valve chamber 172. A guide cylindrical portion 174 is provided in a middle of the retainer 171, and the rear end of the pressing rod 149 is slidably fitted into the guide cylindrical portion 174. A valve seat 175 is provided in the front end of the first reaction piston 67 to face the valve chamber 172, and a valve portion 176 having a hemispherical shape is provided in the rear end of the pressing rod 149 so as to be seated on the valve seat 175.

The pressure reducing valve 107 includes the valve seat 175, and the valve portion 176 that can be seated on the valve seat 175. The first reaction piston 67 axially has a valve hole 177 opening into a central part of the valve seat 175, and a release passage 178 having a larger diameter than the valve hole 177 and a front end communicating with the valve hole 177, and extending to the rear end of the first reaction piston 67. The end wall 66a of the front end of the control piston 66 normally abuts against the rear end of the first reaction piston 67 to substantially close the rear end of the release passage 178.

A plurality of communication holes 179 having inner ends communicating with the release passage 178 are provided in the middle of the first reaction piston 67, and at the time of opening of the pressure reducing valve 107, a working fluid from the release passage 178 flows into the release chamber 132 via the communication holes 179, a temporary storage chamber 180, and an orifice 181.

The temporary storage chamber 180 is formed between the first and second reaction pistons 67 and 68, and has a ring shape surrounding the first reaction piston 67 between an annular step 67b provided in the outer periphery of the first reaction piston 67 to face backward, and an annular step 68c provided in the inner periphery of the second reaction piston 68 to face forward so as to face the step 67b.

The orifice 181 is formed between an outer periphery of the extended cylindrical portion 67a of the first reaction piston 67 and an inner periphery of the extended cylindrical portion 68b of the second reaction piston 68. The orifice 181 is formed by setting an annular gap by an amount of tolerance between the outer periphery of the extended cylindrical portion 67a and the inner periphery of the extended cylindrical portion 68b.

Further, the communication holes 179 are provided in the first reaction piston 67 so as to be placed in a position corresponding to the temporary storage chamber 180 at least when the pressure reducing valve 107 starts opening from a closing state.

In such a fluid pressure booster 13, the brake operation input from the brake pedal 11 is input to the control piston 66 via the stroke simulator 14, and a forward pressing force acts on the first reaction piston 67 from the control piston 66. In a state in which the amount of advancing movement of the control piston 66 relative to the backup piston 64 is less than a predetermined value, only the first reaction piston 67 abuts against the control piston 66, the valve portion 176 is seated on the valve seat 175 according to the advance of the first reaction piston 67 to close the pressure reducing valve 107 and block the communication between the booster fluid pressure generation chamber 121 and the release chamber 132, and the control piston 66, the first reaction piston 67, and the pressing rod 149 further advance. According to the advance of the pressing rod 149, in the pressure increasing valve 106, the valve body 147 is first separated from the first valve seat 143 at the front end of the slide member 144 to open the first valve means 141, then the pressing rod 149 further advances and presses the slide member 144, and the valve portion 150 is separated from the second valve seat 151 to open the second valve means 142.

In the closing state of the pressure reducing valve 107, the fluid pressure in the booster fluid pressure generation chamber 121 acts on the front end of the first reaction piston 67, the first reaction piston 67 and the control piston 66 are retracted so that the brake operation input from the brake pedal 11 and the fluid pressure based on the fluid pressure in the booster fluid pressure generation chamber 121 are balanced to open the pressure reducing valve 107 and close the pressure increasing valve 106. The opening and closing of the pressure increasing valve 106 and the pressure reducing valve 107 are repeated, and thus the output fluid pressure of the fluid pressure generation source 12 is regulated to a booster fluid pressure according to the brake operation input from the brake pedal 11, and applied to the booster fluid pressure generation chamber 121. When the amount of advancing movement of the control piston 66 relative to the backup piston 64 reaches a predetermined value or more, the first reaction piston 67 and also the second reaction piston 68 abut against the control piston 66, and the fluid pressure that presses the second reaction piston 68 backward by the fluid pressure of the input chamber 113 and the spring force of the reaction spring 112 are also added as reaction forces, thereby increasing the reaction that acts on the control piston 66.

With reference to FIG. 1, the connection port 77 provided in the body 17 so as to communicate with the booster fluid pressure working chamber 22 is connected to the fluid pressure generation source 12 via a normally closed automatic brake pressurizing linear solenoid valve 184, and connected to the third reservoir chamber 31c of the reservoir 31 via a normally closed regenerative cooperative pressure reducing linear solenoid valve 185. Specifically, the normally closed automatic brake pressurizing linear solenoid valve 184 is provided between the booster fluid pressure working chamber 22 and the fluid pressure generation source 12, and the normally closed regenerative cooperative pressure reducing linear solenoid valve 185 is provided between the booster fluid pressure working chamber 22 and the reservoir 31.

The output port 79 communicating with the booster fluid pressure generation chamber 121 is connected to the connection port 77 via a normally open automatic brake pressure reducing linear solenoid valve 186 and a normally open regenerative cooperative pressurizing linear solenoid valve 187 connected in series. A first one-way valve 188 is connected to the automatic brake pressure reducing linear solenoid valve 186 in parallel so as to allow the working fluid to flow from the output port 79 toward the connection port 77, and a second one-way valve 189 is connected to the regenerative cooperative pressurizing linear solenoid valve 187 in parallel so as to allow the working fluid to flow from the connection port 77 toward the output port 79.

Specifically, the automatic brake pressure reducing linear solenoid valve 186 to which the first one-way valve 188 is connected in parallel, and the regenerative cooperative pressurizing linear solenoid valve 187 to which the second one-way valve 189 is connected in parallel are provided between the booster fluid pressure generation chamber 121 and the booster fluid pressure working chamber 22.

Further, a brake operation amount detecting fluid pressure sensor 190 is connected between the output port 79 and the automatic brake pressure reducing linear solenoid valve 186, and an automatic brake feedback controlling fluid pressure sensor 191 is connected between the regenerative cooperative pressurizing linear solenoid valve 187 and the connection port 77.

As described above, the normally closed automatic brake pressurizing linear solenoid valve 184 is provided between the fluid pressure generation source 12 and the booster fluid pressure working chamber 22, and the normally open automatic brake pressure reducing linear solenoid valve 186 and the first one-way valve 188 connected to the automatic brake pressure reducing linear solenoid valve 186 in parallel so as to allow the brake fluid to flow from the booster fluid pressure generation chamber 121 toward the booster fluid pressure working chamber 22 are provided between the booster fluid pressure generation chamber 121 and the booster fluid pressure working chamber 22. Thus, even at the time of non-operation of the brake pedal 11, that is, the time of non-operation of the pressure regulating valve means 65, opening and closing of the automatic brake pressurizing linear solenoid valve 184 and the automatic brake pressure reducing linear solenoid valve 186 are controlled to regulate the fluid pressure in the booster fluid pressure working chamber 22, thereby performing automatic brake control such that the brake fluid pressure acts on the wheel brakes B1 to B4 in the non-braking operation state. Further, when the brake pedal 11 is operated with the automatic brake pressure reducing linear solenoid valve 186 being closed to actuate the pressure regulating valve means 65 at the time of automatic braking, so that fluid pressure higher than the fluid pressure in the booster fluid pressure working chamber 22 is generated in the booster fluid pressure generation chamber 121, the fluid pressure in the booster fluid pressure generation chamber 121 can be caused to act on the booster fluid pressure working chamber 22 via the first one-way valve 188, to actuate the master cylinder M in the same way as in the case of normal brake operation.

The normally closed regenerative cooperative pressure reducing linear solenoid valve 185 is provided between the booster fluid pressure working chamber 22 and the reservoir 31, and the normally open regenerative cooperative pressurizing linear solenoid valve 187 and the second one-way valve 189 connected to the regenerative cooperative pressurizing linear solenoid valve 187 in parallel so as to allow the brake fluid to flow from the booster fluid pressure working chamber 22 toward the booster fluid pressure generation chamber 121 are provided between the booster fluid pressure generation chamber 121 and the booster fluid pressure working chamber 22. Thus, at the time of regeneration in the brake operation state, the opening and closing of the regenerative cooperative pressurizing linear solenoid valve 187 and the regenerative cooperative pressure reducing linear solenoid valve 185 are controlled to regulate the fluid pressure in the booster fluid pressure working chamber 22, and thus brake fluid pressure offset from the pressure at the time of normal braking can be output from the master cylinder M, and when the brake pedal 11 is returned at the time of closing of the regenerative cooperative pressurizing linear solenoid valve 187, the fluid pressure in the booster fluid pressure working chamber 22 can be released toward the reservoir 31 via the second one-way valve 189.

With reference to FIG. 6, the stroke simulator 14 forms a stroke fluid chamber 193 with the end wall 66a of the front end of the control piston 66, includes: an input piston 194 as an input member fitted to the control piston 66 fluid-tightly and slidably in the axial direction; and repulsive means 195 mounted between the input piston 194 and the end wall 66a of the control piston 66 and housed in the stroke fluid chamber 193, and is included in the control piston 66.

The input piston 194 is slidably fitted to the rear portion of the control piston 66 so that a retraction limit position is restricted by a snap ring 196 mounted to the rear end of the control piston 66, and a front end of an input rod 197 connected to the brake pedal 11 is oscillably connected to the input piston 194. Specifically, the brake operation force according to the operation of the brake pedal 11 is input to the input piston 194 via the input rod 197, and the input piston 194 advances according to the input of the brake operation force. Further, an annular seal member 198 that comes into slide contact with the inner periphery of the control piston 66 is mounted to the outer periphery of the input piston 194.

The repulsive means 195 includes an elastic body 199 made of an elastic material such as rubber and having a cylindrical shape, and a metal coil spring 200 having a spring load smaller than the elastic body 199, connected in series via a slide member 201 slidably housed in the control piston 66. The elastic body 199 is provided between the slide member 201 and the input piston 194, and the coil spring 200 is provided between the end wall 66a of the front end of the control piston 66 and the slide member 201.

Further, the elastic body 199 and the coil spring 200 are mounted in series between the input piston 194 and the control piston 66 so that a spring force exerted by the coil spring 200 acts on the control piston 66 in early stages of the brake operation of the brake pedal 11, and the slide member 201 abuts against the end wall 66a of the front end of the control piston 66 to start elastic deformation of the elastic body 199 after the action of the spring force of the coil spring 200 on the control piston 66 is finished.

The coil spring 200 has a set load lower than other spring members connected to the coil spring 200 in series so as to exert forward and backward spring forces. In this embodiment, the set load is lower than a set load of the spring 134 connected to the coil spring 200 in series via the first reaction piston 67 and the end wall 66a of the control piston 66 and housed in the booster fluid pressure generation chamber 121.

A front end of a guide shaft 202 that is coaxial with the control piston 66 and passes through the elastic body 199 is pressed into a middle of the slide member 201, and a rear end of the guide shaft 202 is slidably fitted to the input piston 194. Specifically, in the middle of the input piston 194, a slide hole 203 that slidably fits the rear end of the guide shaft 202, and a bottomed hole 204 having a larger diameter than the slide hole 203, a front end connected to a rear portion of the slide hole 203, and a closed rear end are coaxially provided. The rear end of the guide shaft 202 protrudes into the bottomed hole 204 according to forward movement of the input piston 194 relative to the guide shaft 202.

A plurality of through holes 205 that provide communication between the release chamber 132 that the front surface of the end wall 66a faces and the stroke fluid chamber 193 are bored in the end wall 66a of the front end of the control piston 66 with the same distance from the center of the control piston 66. The working fluid is introduced into the stroke fluid chamber 193 in the control piston 66 via the through holes 205.

The through holes 205 are closed by the seat stopper 135 secured to the backup piston 64 when the control piston 66 advances by a predetermined advance stroke or more. The seat stopper 135 includes: a retainer 206 secured to the backup piston 64 so as to abut against the inward flange 64d by press-fitting an outer periphery thereof into the inner periphery the rear small diameter portion 64b in the backup piston 64; and an elastic seal member 207 held by the retainer 206.

Figure 9:
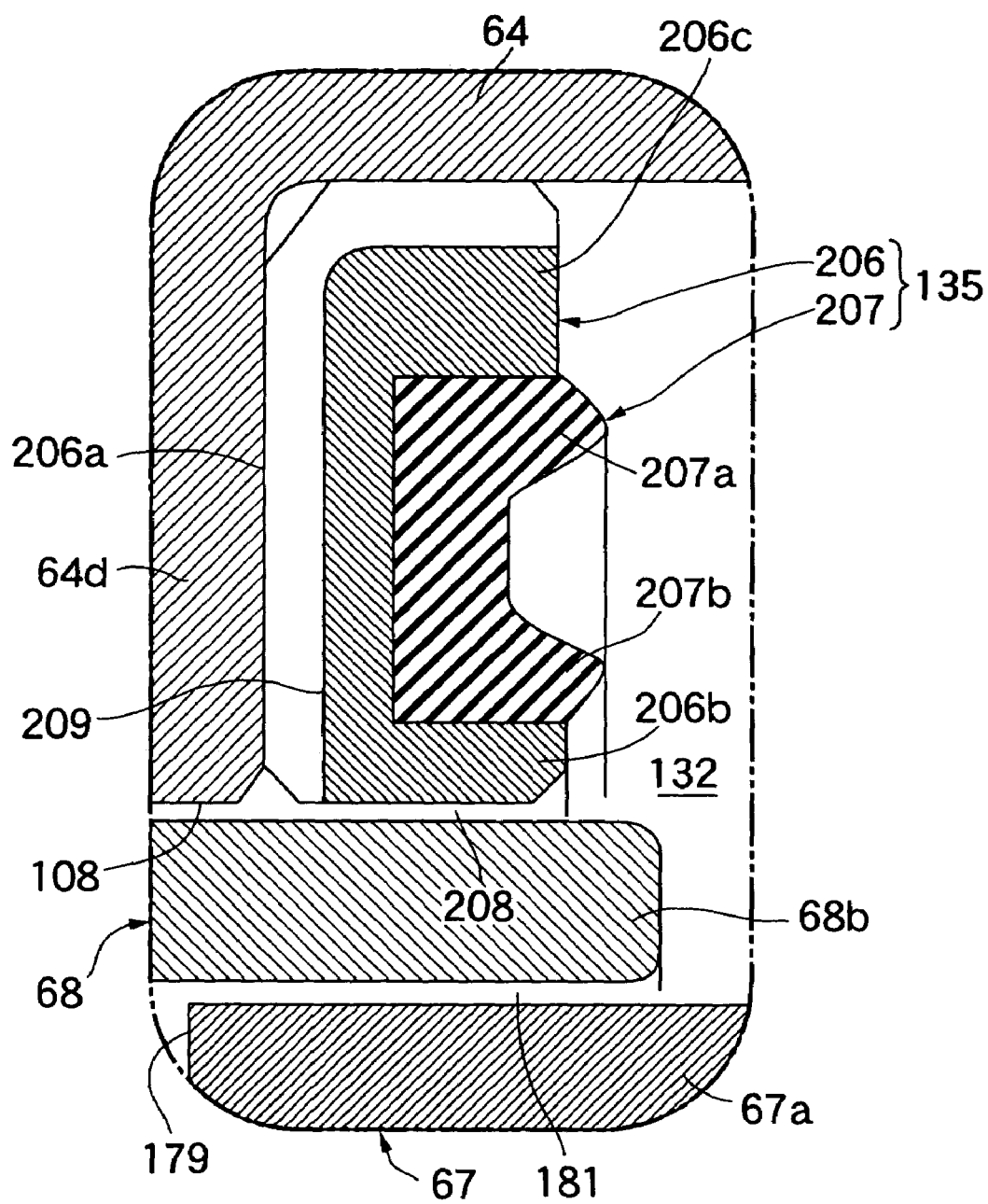
FIG. 9 is an enlarged view of a part 9 in FIG. 5.

In FIG. 9, the retainer 206 integrally includes: a ring plate 206a that abuts against the inward flange 64d from behind, an inner cylindrical portion 206b having a cylindrical shape surrounding the extended cylindrical portion 68b of the second reaction piston 68 and having a front end connected to an inner periphery of the ring plate 206a, and an outer cylindrical portion 206c having a cylindrical shape coaxially surrounding the inner cylindrical portion 206b and having a front end connected to an outer periphery of the ring plate 206a, and is made of material having a rigidity such as metal, and has a ring shape. The outer cylindrical portion 206c is press-fitted into the backup piston 64 so as to form an annular minute gap 208 between the extended cylindrical portion 68b and the inner cylindrical portion 206b.

An elastic seal member 207 includes inner and outer cylindrical lips 207a and 207b so as to come into contact with the front surface of the end wall 66a on inner and outer sides of the through holes 205 radially of the control piston 66 and closes the through holes 205. The elastic seal member 207 is inserted between the inner cylindrical portion 206b and the outer cylindrical portion 206c, and bonded to the retainer 206 by baking. Part of the lips 207a and 207b protrude from the retainer 206 toward the control piston 66 in a normal state in which the end wall 66a of the control piston 66 does not abut against the lips.

Further, when the control piston 66 further advances from a state where the lips 207a and 207b of the elastic seal member 207 come into contact with the end wall 66a, the inner cylindrical portion 206b and outer cylindrical portion 206c in the retainer 206 abut against the front surface of the end wall 66a outside the elastic seal member 207 and can obtain a metal touch. As a result, the outer cylindrical portion 206c comes into contact with the front surface of the end wall 66a radially outward of the lips 207a and 207b in contact with the front surface of the end wall 66a on the inner and outer sides of the through holes 205 radially of the control piston 66, and the inner cylindrical portion 206b comes into contact with the front surface of the end wall 66a radially inward of the lips 207a and 207b.

In a rear surface of the retainer 206, that is, outer surfaces of the ring plate 206a and the outer cylindrical portion 206c, a communication groove 209 is provided for communication between the inner side of the retainer 206 and a portion of the release chamber 132 outside the control piston 66 with the end wall 66a of the control piston 66 coming into contact with the lips 207a and 207b of the elastic seal member 207.

Specifically, in a state in which the end wall 66a of the control piston 66 is in contact with the lips 207a and 207b of the elastic seal member 207, also the extended cylindrical portion 68b of the second reaction piston 68 comes into contact with the end wall 66a, a portion between the retainer 206 and the extended cylindrical portion 68b communicates with the portion of the release chamber 132 outside the control piston 66 via the minute gap 208 and the communication groove 209; and in a state in which the end wall 66a of the control piston 66 is in contact with the elastic seal member 207, negative pressure is not generated in a space that the rear portion of the retainer 206 faces inward of the elastic seal member 207 according to the retraction of the control piston 66, and atmospheric pressure is maintained.

Returning to FIG. 6, the control piston 66 has a bottomed cylindrical shape with part of the inner peripheral surface thereof being a tapered surface 210 with a diameter decreasing toward the front forward of the input piston 194. In this embodiment, a front half of the control piston 66 is formed as a tapered cylindrical portion 66b with the inner peripheral surface being the tapered surface 210.

The slide member 201 is slidably housed in the control piston 66 forward of the tapered surface 210. The elastic body 199 mounted between the slide member 201 and the input piston 194 has a cylindrical shape so as to be elastically deformed according to the action of an axial compressive force along with the advance of the input piston 194, and prevented from being deformed sequentially from the front by restraint with the tapered surface 210 according to an increase in the axial compressive force, and the cylindrical shape has the same outer diameter along the axial length thereof in a non-acting state of the load.

The guide shaft 202 fitted to the input piston 194 so that the rear end thereof is supported by the input piston 194 has a cylindrical shape and a coaxial release passage 211 along the axial length thereof. In the in put piston 194, a plurality of passages 212 having inner ends opening into the bottomed hole 204 communicating with the release passage 211 are provided radially of the input piston 194 forward of a portion to which the seal member 198 is mounted. Thus, the passages 212 and the bottomed hole 204 provide communication between the portion between the elastic body 199 and the control piston 66, and the release passage 211 of the guide shaft 202 in the stroke fluid chamber 193.

A release passage 213 coaxially connected to the front end of the release passage 211 is provided in the slide member 201. A plurality of grooves 214 for preventing the release passage 213 from being closed by the end wall 66a when the slide member 201 abuts against the end wall 66a of the front end of the control piston 66 are radially provided in a front end surface of the slide member 201.

With such a configuration, until the through holes 205 are closed by the seat stopper 135 at the time of advance of the control piston 66 and the stroke fluid chamber 193 enters a fluid pressure lock state, a portion between the elastic body 199 in the control piston 66 and the control piston 66 communicates with the release chamber 132 via the passages 212, the bottomed hole 204, the release passages 211 and 213, the groove 214, and the through holes 205. Specifically, the portion between the elastic body 199 and the control piston 66 communicates with the release chamber 132, that is, the reservoir 31, in an advance stroke of the control piston 66 until the working fluid is sealed in the control piston 66.

A rear end of a boot 215 that covers a protruding portion of the control piston 66 from the body 17 is mounted to the input rod 197 connected to the brake pedal 11, and a front end of the boot 215 is mounted to the rear end of the body 17. Further, a release passage 216 that provides communication between the inside of the boot 215 and the outside is provided in the rear end of the body 17

Next, an operation of the embodiment will be described. In the tandem type master cylinder M, the rear master piston 23 having the rear surface facing the booster fluid pressure generation chamber 22, and the front master piston 24 that forms the rear output fluid pressure chamber 25 with the rear master piston 23 and has the front surface facing the front output fluid pressure chamber 26 are slidably housed in the cylinder body 16. The short cylindrical separator 18, the cylindrical first sleeve 19 that forms the channel 94 with the separator 18 and is placed backward of the separator 18, and the stepped cylindrical second sleeve 20 placed backward of first sleeve 19 are fluid-tightly fitted and secured to the body 17 connected to the cylinder body 16 so as to constitute the casing 15 with the cylinder body 16. The backup piston 64 that can directly presses the rear master piston 23 at the time of reduction in the fluid pressure in the fluid pressure generation source 12 forms the annular passage 93 communicating with the channel 94 with the inner periphery of the first sleeve 19 and is slidably fitted to the separator 18, the first sleeve 19, and the second sleeve 20. The O ring 95 that seals the front side of the annular passage 93 is mounted to the inner periphery of the separator 18 so as to come into repulsive contact with the outer periphery of the backup piston 64, and the O ring 96 that seals the rear side of the annular passage is mounted to the outer periphery of the backup piston 64 so as to come into repulsive contact with the inner periphery of the first sleeve 19.

Thus, even if the backup piston 64 advances so as to directly press the rear master piston 23, the O ring 95 that seals between the backup piston 64 and the separator 18 is not moved, thereby allowing an axial length of the separator 18 to be reduced and allowing an axial length of the casing 15 to be reduced to contribute to reduction in the entire axial length of the vehicle braking device.

The first sleeve 19 has the larger inner diameter than the separator 18 and the same inner diameter over the entire axial length thereof. The backup piston 64 includes: the front small diameter portion 64a that forms the annular passage 93 with the inner periphery of the first sleeve 19 and is slidably fitted to the separator 18; and the middle large diameter potion 64c that has the larger diameter than the front small diameter portion 64a and is slidably fitted to the first sleeve 19, and has the stepped cylindrical shape, thereby easily forming the annular passage 93.

The annular recess 86 that opens the inner end of the connection port 77, the annular recess 87 that opens the inner end of the input port 78, and the annular recess 88 that opens the inner end of the output port 79 are provided in the inner periphery of the body 17, and the O rings 89, 90, 91, and 92 that seal the annular recesses 86, 87, and 88 from the opposite sides are mounted to the outer peripheries of the cylinder body 16 of the master cylinder M, the separator 18, the first sleeve 19, and the outer periphery of the second sleeve 20. The spaces L1 and L2 between the front edges of the annular recesses 86 to 88 in the fitting direction of the separator 18, the first sleeve 19, and the second sleeve 20 into the body 17 are set to values that prevent the plurality of O rings 90 to 92 from simultaneously passing through the front edges when the separator 18, the first sleeve 19, and the second sleeve 20 are fitted into the body 17. In the embodiment, the space L1 between the front edges of the annular recesses 86 and 87 is set to the smaller value than the space L3 between the O rings 90 and 91, and the space L2 between the front edges of the annular recesses 87 and 88 is set to the smaller value than the space L4 between the O rings 91 and 92.

Such setting of the spaces L1 to L4 prevents two or more O rings among the three O rings 90 to 92 from simultaneously passing through the plurality of front edges in the fitting direction of the annular recesses 86 to 88, when the separator 18, the first sleeve 19, and the second sleeve 20 are fitted and assembled to the body, eliminates the need for a large force for fitting of the separator 18, the first sleeve 19, and the second sleeve 20, and allows the separator 18, the first sleeve 19, and the second sleeve 20 to be fitted without a large force, thereby preventing damage to the O rings 90 to 92, and facilitating fitting and assembling of the separator 18, the first sleeve 19, and the second sleeve 20 to the body 17 to improve assemblability.

The backup piston 64 is provided in a compressed manner between the second sleeve 20 and the retainer 102 mounted to the rear portion of the backup piston 64, and urged toward the retraction limit that abuts against the inward flange 17a via the stopper 100 by the return spring 103 surrounding the rear half of the backup piston 64. The rear return spring 29 of the master cylinder M does not need to exert a spring force for urging the backup piston 64 toward the retraction limit.

Thus, only fluid pressure higher than a relatively small spring force is required to act on the booster fluid pressure working chamber 22 for advancing the rear master piston 23, thereby preventing the delay of actuation of the master cylinder M in early stages of the brake operation. Setting the spring force of the return spring 103 for urging the backup piston 64 toward the retraction limit to a relatively large value can reliably return the backup piston 64 to the retraction limit after the actuation.

The control piston 66 included in the fluid pressure booster 13 is formed separately from the backup piston 64 so as to abut against, press, and actuate the backup piston 64 at the time of reduction in the fluid pressure in the booster fluid pressure generation chamber 121, and thus tolerance from the front end of the backup piston 64 to the rear end of the control piston 66 can be absorbed to improve the assemblability. The front end of the backup piston 64 at the retraction limit abuts against the rear master piston 23 in the non-operation state of the brake pedal 11, and thus tolerance at the time of assembling of the backup piston 64 itself to the fluid pressure booster 13 is controlled to eliminate the need for adjusting an invalid stroke when the fluid pressure booster 13 and the master cylinder M are connected, thereby further improving the assemblability.

Further, the front end of the backup piston 64 abuts against the entire peripheral edge of the rear surface of the rear master piston in the non-operation state of the brake pedal 11, thereby ensuring smooth actuation of the rear master piston 23 by pressing the backup piston 64.

Further, the passage 139 that leads the fluid pressure from the fluid pressure booster 13 to the front end of the backup piston 64 and the rear surface of the rear master piston are formed between abutting portions of the front end of the backup piston 64 and the rear surface of the rear master piston 23, so that the booster fluid pressure can be easily caused to act on the entire rear surface of the rear master piston 23 in the abutting state of the backup piston 64. The groove 140 that forms the passage 139 with the front end of the backup piston 64 is provided in the rear surface of the rear master piston 23, and thus the passage 139 can be easily formed between the front end of the backup piston 64 and the rear surface of the rear master piston 23.

The long through hole 44 is provided in the rear master piston 23 along one diameter line of the rear master piston 23 and along the axis of the rear master piston 23. The master cylinder M is of the center valve type so that the stopper pin 43 secured to the cylinder body 16 is inserted into the through hole 44, the groove 140 is provided in the rear surface of the rear master piston 23 in parallel with the axis of the through hole 44, and thus the groove 140 formed in the rear surface of the rear master piston 23 can be used for positioning at the time of inserting the rear master piston 23 into the cylinder body 16, thereby improving the assemblability.

The booster fluid pressure generated in the fluid pressure booster 13 is once taken out of the body 17 and then guided to the booster fluid pressure working chamber 22 in the cylinder body 16. The passage 137 is formed between the rear end of the cylinder body 16 and the separator 18 so as to provide communication between the annular recess 86 communicating with the connection port 77 to which the booster fluid pressure from the fluid pressure booster 13 is led and the booster fluid pressure working chamber 22, thereby simplifying a passage structure for leading the booster fluid pressure from the outside of the cylinder body 16 and the body 17 into the booster fluid pressure working chamber 22. Further, the separator 18 abuts against the rear end of the cylinder body 16, and the passage 137 is constituted by the groove 138 provided in the rear end of the upper portion of the cylinder body 16 and the separator 18, so that specifying the upper position of the cylinder body 16 with the groove 138 facilitates assembling of the cylinder body 16 and the body 17, and increases air venting properties of the booster fluid pressure working chamber 22.

The fluid pressure booster 13 includes: the control piston 66 in which the brake operation input from the brake pedal 11 acts in the advancing direction, and the reaction based on the fluid pressure in the booster fluid pressure generation chamber 121 acts in the retracting direction; the pressure increasing valve 106 provided between the booster fluid pressure generation chamber 121 and the input chamber 113 communicating with the fluid pressure generation source 12 so as to open at the time of the advance of the control piston 66 and close at the time of the retraction of the control piston 66; and the pressure reducing valve 107 provided between the release chamber 132 communicating with the reservoir 31 and the booster fluid pressure generation chamber 121 so as to close at the time of the advance of the control piston 66 and open at the time of the retraction of the control piston 66. The fluid pressure booster 13 is built in the backup piston 64. The pressure increasing valve 106 includes the first and second valve means 141 and 142 that sequentially opens according to the increase in the brake operation input, and the seal diameter of the second valve means 142 is larger than the seal diameter of the first valve means 141.

Thus, in the early stages of the brake operation requiring small brake operation input, initial response can be ensured by opening the first valve means 141 having a small activation load (a force required for opening the valve), and response can be increased by opening both the first and second valve means 141 and 142 when the brake pedal 11 is strongly operated, thereby enhancing the initial response of the pressure increasing valve 106 as well as the response of the pressure increasing valve 106 when the brake pedal 11 is strongly operated.

The first and second valve means 141 and 142 are axially arranged side by side along the axis of the control piston 66, and thus the pressure increasing valve 106 including the first and second valve means 141 and 142 can be made compact, and the second valve means 142 is configured to start opening before the rate of flow from the opened first valve means 141 reaches maximum. Thus, as shown in FIG. 10, the second valve means 142 opens after the first valve means 141 opens according to the advance of the pressing rod 149 and before the rate of flow from the first valve means 141 reaches maximum, and thus the first and second valve means 141 and 142 continuously smoothly open according to the increase in the brake operation input, thereby preventing a feeling of stepped stroke and providing a good operation feeling.

The first valve means 141 of the pressure increasing valve 106 includes: the slide member 144 that constitutes at least part of the inserted means 156 inserted into the backup piston 64 and supported and has the first valve seat 143; the retainer 146 that forms the valve chamber 145 that communicates with the fluid pressure generation source 12 and that the first valve seat 143 faces, and is mounted to the valve seat member 117 of the inserted means 156; the valve body 147 that can be seated on the first valve seat 143 and is slidably fitted to the retainer 146; the first valve spring 148 that urges the valve body 147 to be seated on the first valve seat 143 and is provided between the retainer 146 and the valve body 147; and the pressing rod 149 that can abut against the valve body 147, cooperates with and is connected to the control piston 66, and is inserted into the slide member 144 movably in the axial direction.

With such a configuration of the first valve means 141, the slide member 144 that constitutes part of the inserted means 156 before being inserted into the backup piston 64 has the first valve seat 143, the valve body 147 is housed in the valve chamber 145 in the retainer 146 mounted to the inserted means 156, the first valve spring 148 is provided between the valve body 147 and the retainer 146, and the pressing rod 149 is inserted into the slide member 144, thereby assembling the components of the pressure increasing valve 106 to the inserted means 156, and improving the assemblability of the pressure increasing valve 106.

The communication holes 165 that provide communication between the input chamber 113 communicating with the fluid pressure generation source 12 and the valve chamber 145 are provided in the side wall of the retainer 146 so as to be placed on the opposite side of the valve body 147 relative to the seating position of the valve body 147 on the first valve seat 143. Thus, the high pressure working fluid flowing from the communication holes 165 into the valve chamber 145 does not flow along the side of the valve body 147 toward the first valve seat 143, thereby preventing the valve body 147 from being engulfed by the flow of the working fluid, and improving seating properties of the valve body 147.

The second valve means 142 includes: the valve portion 150 provided in the slide member 144 that is the common component shared with the first valve means 141; the valve seat member 117 that has the second valve seat 151 on which the valve portion 150 can be seated and slidably fits the slide member 144; the retainer 146 that is the common component shared by the first valve means 141; and the second valve spring 152 that urges the valve portion 150 to be seated on the second valve seat 151 and is provided between the retainer 146 and the slide member 144. The pressing rod 149 common to the first and second valve means 141 and 142 is formed to press the slide member 144 so that the valve portion 150 is separated from the second valve seat 151 after the opening of the first valve means 141 at the time of increase in the brake operation input.

Specifically, although the pressure increasing valve 106 has a valve structure that opens in two stages, the slide member 144, the retainer 146, and the pressing rod 149 are common to the first and the second valve means 141 and 142, thereby reducing the increase in the number of components to provide a compact configuration.

Further, the axially-extending flow grooves 161 each having one end communicating with the valve chamber 145 and the other end communicating with the booster fluid pressure generation chamber 121 when the valve portion 150 is separated from the second valve seat 151 in the second valve means 142 are provided in the inner surface of the valve seat member 117. The slide hole 160 and the plurality of flow grooves 161 in the valve seat member 117 form the flow passage 162, thus the working fluid can be caused to flow from the valve chamber 145 into the booster fluid pressure generation chamber 121 through the flow passage 162 at the time of opening of the second valve means 142, so that a sufficient flow rate of working fluid can be ensured without increasing the inner peripheral diameter of the valve seat member 117, that is, without increasing the size of the fluid pressure booster 13. Further, at the time of opening of the first valve means 141, the working fluid flowing from the valve chamber 145 into the annular chamber 163 flows through the flow passage 162 toward the booster fluid pressure generation chamber 121 via the communication hole 164, so that flow resistance can be also reduced at the time of opening of the first valve means 141 to allow the working fluid of the valve chamber 145 to flow toward the booster fluid pressure generation chamber 121.

The pressing rod 149 is slidably fitted to the middle of the disk-shaped rectifying member 168 that can abut against the surface facing the booster fluid pressure generation chamber 121 of the valve seat member 117 to close the open end of the flow passage 162 opening into the booster fluid pressure generation chamber 121. The rectifying member 168 whose axial movement is guided only by the pressing rod 149 is urged toward the valve seat member 117 by such a spring force as to separate the rectifying member 168 from the valve seat member 117 according to the fluid pressure from the fluid pressure generation source 12, that is, from the input chamber 113 acting on the flow passage 162. When the high pressure working fluid from the fluid pressure generation source 12 flows through the flow passage 162 into the booster fluid pressure generation chamber 121 along with the opening of the pressure increasing valve 106, the working fluid pushes away the rectifying member 168 so as to be separated from the valve seat member 117 to rectify the flow, thereby suppressing generation of operation noise or pulsing caused by the opening of the pressure increasing valve 106. Further, the axial movement of the rectifying member 168 is guided only by the pressing rod 149 that is slidably fitted to the middle of the rectifying member 168, thereby preventing resistance or catching in the axial movement of the rectifying member 168 to ensure smooth actuation of the rectifying member 168.

A pressure receiving area facing the flow passage 162 of the rectifying member 168 is changed to change valve opening pressure of the rectifying member 168, thereby increasing the degree of freedom in design. Further, the surface of the rectifying member 168 facing the flow passage 162 is the flat surface 168a, and thus the inner diameter or the shape of the flow passage 162 is simply changed to change the valve opening pressure of the rectifying member 168, thereby further increasing the degree of freedom in design.

The first reaction piston 67 is coaxially connected to the control piston 66 so that the fluid pressure in the booster fluid pressure generation chamber 121 acts in the retracting direction, and the first reaction piston 67 is fitted to the second reaction piston 68 relatively slidably in the axial direction. The release passage 178 communicating with the booster fluid pressure generation chamber 121 at the time of opening of the pressure reducing valve 107 is provided in the first reaction piston 67, and the release passage 178 is connected to the release chamber 132, through the temporary storage chamber 180 that temporarily stores the working fluid from the release passage 178 and through the orifice 181 that is provided between the release chamber 132 that the front surface of the control piston 66 faces and that communicates with the reservoir 31 and the temporary storage chamber 180.

Thus, when the high pressure in the booster fluid pressure generation chamber 121 is released to the release chamber 132 along with the opening of the pressure reducing valve 107, the working fluid flows from the release passage 179 provided in the first reaction piston 67 to the release chamber 132 via the temporary storage chamber 180 and the orifice 181, so that the fluid pressure of the working fluid temporarily stored in the temporary storage chamber 180 is narrowed by the orifice 181, thereby slowly releasing the high fluid pressure toward the release chamber 132 to prevent generation of operation noise.

The steps 67b and 68c facing each other are provided in the outer periphery of the first reaction piston 67 and the inner periphery of the second reaction piston 68, and the temporary storage chamber 180 has the ring shape surrounding the first reaction piston 67 between the steps 67b and 68c, so that the temporary storage chamber 180 can be easily formed.

Further, the orifice 181 is formed by setting the annular gap by the amount of the tolerance between the outer periphery of the first reaction piston 67 and the inner periphery of the second reaction piston 68, so that the orifice 181 can be easily formed.

The stroke simulator 14 includes the elastic body 199 made of the elastic material and the metal coil spring 200 having the smaller spring constant than the elastic body 199, which are connected in series between the input piston 194 and the control piston 66 connected to the brake pedal 11 so that the elastic deformation of the elastic body 199 is started after the completion of the action of the spring force exerted by the coil spring 200 in the early stages of the brake operation on the control piston 66. The coil spring 200 has the lower set load than other springs 134 connected to the coil spring 200 in series so as to exert the forward and backward spring forces.

Thus, the load from the coil spring 200 previously acts on the elastic body 199, and even if the elasticity of the elastic body 199 is deteriorated, the coil spring 200 absorbs the deterioration to eliminate the invalid stroke at the time of normal braking, and two stage operation simulating properties by the elastic body 199 and the coil spring 200 can be obtained irrespective of the deterioration of the elastic body 199. Further, in the early stages of the brake operation, the coil spring 200 of the stroke simulator 14 is deformed to obtain the invalid stroke, and relatively small brake operation input is applied in the early stages of the brake operation to improve the operation feeling.

The control piston 66 has the cylindrical shape with part of the inner peripheral surface thereof being the tapered surface 210 with the diameter decreasing toward the front. The elastic body 199 of the stroke simulator 14 is axially slidably housed in the control piston 66 backward of the tapered surface 210 while being mounted between the input piston 194 connected to the brake pedal 11 and the control piston 66. The elastic body 199 is elastically deformed according to the action of the axial compressive force along with the advance of the input piston 194, and is prevented from being deformed sequentially from the front by the restraint with the tapered surface 210 according to the increase in the axial compressive force.

Specifically, when the input piston 194 advances according to the brake operation of the brake pedal 11, the coil spring 200 is compressed to increase the stroke in proportion to the input load until the advance stroke reaches S1 as shown in FIG. 11. Then, when the input piston 194 advances while axially compressing the elastic body 199, the elastic body 199 is elastically deformed according to the axial compression, but the elastic deformation of the elastic body 199 is sequentially prevented from the front by the restraint with the tapered surface 210 of the control piston 66 according to the increase in the axial compressive force, thereby increasing the amount of change in the input load relative to the operation stroke of the brake pedal 11. On the other hand, when the brake operation force by the brake pedal 11 is released, elastic energy increased by the restraint with the tapered surface 210 acts on the brake operation pedal 11 in the returning direction in a state in which the elastic deformation of the elastic body 199 is prevented by the restraint. Thus, a relationship between the brake operation stroke and the operation load in the stroke simulator 14 can have a nonlinear characteristic and a large hysteresis width, thereby reducing an operation load on a driver. This provides an operation feeling equivalent to that of a general vehicle braking device including a combination of a master cylinder, a negative pressure booster, and a wheel brake, and reduces uncomfortable feelings for the driver.

The elastic body 199 has the cylindrical shape with the same outer diameter along the axial length thereof in the non-acting state of the load, thereby simplifying the shape of the elastic body 199 to facilitate molding of the elastic body 199, and preventing generation of offset loads on the elastic body 199 to increase durability of the elastic body 199.

The working fluid is introduced into the control piston 66, and the portion between the elastic body 199 and the control piston 66 communicates with the reservoir 31 in the advance stroke of the control piston 66 until the working fluid is sealed in the control piston 66. This prevents the working fluid in the control piston 66 from being locked between the elastic body 199 and the control piston 66 before the control piston 66 reaches a predetermined advance stroke, allowing the elastic body 199 to reliably abut against the inner peripheral surface of the control piston 66 to obtain desired hysteresis, and preventing impairment of operability.

The cylindrical guide shaft 202 coaxially having the release passage 211 that provides communication between the portion between the elastic body 199 and the control piston 66 and the reservoir 31, and passes through the elastic body 199 is supported by the input piston 194, that is, the release passage 211 can be formed with a simple configuration.

The control piston 66 has the bottomed cylindrical shape, and has, at the front end thereof, the end wall 66a having the front surface that faces the release chamber 132 communicating with the reservoir 31 and is formed in the backup piston 63 and the through holes 205, the input piston 194 forms the stroke fluid chamber 193 with the end wall 66a and is fluid-tightly and slidably fitted to the control piston 66, and the elastic seal member 207 that closes the through holes 205 in the advance stroke with a predetermined amount or more of the control piston 66 is held by the retainer 206 having rigidity and pressed into the backup piston 64. Thus, when the through holes 205 in the front end of the control piston 66 are closed in the advance stroke of the predetermined amount or more of the control piston 66, the stroke fluid chamber 193 is sealed to prevent movement of the input piston 194 relative to the control piston 66 in the advancing direction, thereby suppressing the increase in the stroke and the reaction of the brake pedal 11 that are made invalid by the stroke simulator 14 at the time of failure of the fluid pressure generation source 12. Further, the structure for sealing the working fluid in the control piston 66 in the advance stroke of the predetermined amount or more of the control piston 66 is simplified, and further the elastic seal member 207 is held by the retainer 206 having the rigidity and pressed into the backup piston 64, thereby facilitating assembling of the retainer 206, that is, the elastic seal member 207 to the backup piston 64.

The elastic seal member 207 is bonded to the metal retainer 206 by baking, thereby enhancing sealability of the elastic seal member 207 to the retainer 206.

Further, the end wall 66a has the plurality of through holes 205 to allow the working fluid to flow between the stroke fluid chamber 193 and the release chamber 132 with good response according to the actuation of the input piston 194, and the ring-shaped elastic seal member 207 that can close the through holes 205 in common is held by the ring-shaped retainer 206, thereby allowing the plurality of through holes 205 to be closed by the single elastic seal member 207 to reduce the number of components. Further, the communication groove 209 is provided in the rear surface of the retainer 206 so as to provide communication between the inner side of the retainer 206 and the portion of the release chamber 132 outside the control piston 66 in a state in which the elastic seal member 207 is in contact with the end wall 66a. Thus, the inner side of the retainer 206 is at atmospheric pressure with the through holes being closed by the elastic seal member 207, thereby preventing any difference in pressure between the front and rear of the retainer 206 when the control piston 66 is retracted from the state of contact with the elastic seal member 207, and preventing the difference in pressure from causing an unstable state of the retainer 206 secured to the backup piston 64.

Further, the retainer 206 that holds the elastic seal member 207 can abut against the front surface of the end wall 66a outside the elastic seal member 207 to obtain a metal touch, and a protrusion of the elastic seal member 207 from the retainer 206 or erosion caused by the protrusion is prevented to increase sealability when the working fluid is sealed in the control piston 66 in the advance stroke of the predetermined amount or more of the control piston 66.

The embodiment of the present invention has been described above, but the present invention is not limited to the embodiment, and various changes in design may be made without departing from the present invention described in claims.

For example, in the embodiment, the vehicle braking device including the tandem type master cylinder M has been described, but the present invention may be applied to a vehicle braking device including a master cylinder in which a single master piston is slidably housed in a casing.

What is claimed is:

1. A vehicle braking device comprising:
   a master cylinder in which a master piston having a rear surface facing a booster fluid pressure working chamber is slidably housed in a casing;
   pressure regulating valve means for regulating output fluid pressure from a fluid pressure generation source to fluid pressure corresponding to a brake operation input from a brake operation member to cause the fluid pressure to act on the booster fluid pressure working chamber;
   a backup piston that has a closed front end facing the booster fluid pressure working chamber and is slidably housed in the casing so as to directly press the master piston from behind corresponding to an operation of the brake operation member when the output fluid pressure from the fluid pressure generation source is reduced;
   a short cylindrical separator fluid-tightly fitted and secured to the casing so that a front outer periphery of the backup piston is slidably fitted to the short cylindrical separator; and
   a cylindrical sleeve that forms a channel between the cylindrical sleeve and the separator, forms an annular passage communicating with the channel between the cylindrical sleeve and an outer periphery of the backup piston, and is fluid-tightly fitted and secured to the casing backward of the separator,
   annular seal members for sealing front and rear sides of the annular passage being mounted between the separator and the backup piston, and between the sleeve and the backup piston,
   wherein the seal member for sealing a front side of the annular passage is mounted to an inner periphery of the separator so as to come into repulsive contact with the outer periphery of the backup piston; and the seal member for sealing a rear side of the annular passage is mounted to the outer periphery of the backup piston so as to come into repulsive contact with an inner periphery of the sleeve.

2. The vehicle braking device according to claim 1, wherein the sleeve has a inner diameter which is larger than the separator and constant over an entire axial length thereof, and the backup piston includes a small diameter portion that forms the annular passage between the backup piston and the inner periphery of the sleeve and is slidably fitted to the separator, and a large diameter portion that has a diameter larger than the small diameter portion and is slidably fitted to the sleeve, so that the backup piston has a stepped cylindrical shape.

3. The vehicle braking device according to claim 1 or 2, wherein the device further comprises: a control piston which is operated so as to establish a balance between a reaction based on fluid pressure in a booster fluid pressure generation chamber communicating with the booster fluid pressure working chamber and the brake operation input from the brake operation member, and into which a working fluid is introduced; and
   a stroke simulator that includes repulsive means mounted between the control piston and an input member communicating with the brake operation member and housed in the control piston, and that is configured to seal the working fluid in the control piston in an advance stroke of a predetermined amount or more of the control piston, to thereby prevent advancing movement of the input member relative to the control piston; and
   a release chamber communicating with a reservoir is formed in the backup piston including the pressure regulating valve means for regulating the output fluid pressure from the fluid pressure generation source corresponding to axial operation of the control piston to cause the fluid pressure to act on the booster fluid pressure generation chamber,
   the control piston has a bottomed cylindrical shape with an end wall, at a front end thereof, having a front surface facing the release chamber and provided with a through hole,
   the input member forms a stroke fluid chamber between the input member and the end wall, and is fluid-tightly and slidably fitted to the control piston, and
   a seat stopper is secured to the backup piston, and comprises a metal retainer and an elastic seal member that comes into repulsive contact with a front surface of the end wall so as to close the through hole in the advance stroke of a predetermined amount or more of the control piston, the metal retainer abutting against the front surface of the end wall outside the elastic seal member so as to provide a metal touch.

* * * * *